(12) United States Patent
Yumino et al.

(10) Patent No.: US 12,325,769 B2
(45) Date of Patent: Jun. 10, 2025

(54) FLUORORESIN, FLUORORESIN PARTICLES, AND METHODS FOR PRODUCING THESE

(71) Applicants: TOSOH CORPORATION, Shunan (JP); NITTO DENKO CORPORATION, Osaka (JP)

(72) Inventors: Shohei Yumino, Yokkaichi (JP); Tomoya Shimono, Yokkaichi (JP); Kota Sakaguchi, Yokkaichi (JP); Tomonari Nagai, Yokkaichi (JP); Kazunari Iwanaga, Yokkaichi (JP); Masao Tanabiki, Yokkaichi (JP); Toru Doi, Yokkaichi (JP)

(73) Assignees: TOSOH CORPORATION, Shunan (JP); NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/471,482

(22) Filed: Sep. 21, 2023

(65) Prior Publication Data

US 2024/0059809 A1 Feb. 22, 2024

Related U.S. Application Data

(62) Division of application No. 17/280,624, filed as application No. PCT/JP2019/038144 on Sep. 27, 2019, now Pat. No. 11,807,702.

(30) Foreign Application Priority Data

Sep. 28, 2018 (JP) .................................. 2018-183594
Feb. 19, 2019 (JP) .................................. 2019-027318

(Continued)

(51) Int. Cl.
*C08F 24/00* (2006.01)

(52) U.S. Cl.
CPC .................................. *C08F 24/00* (2013.01)

(58) Field of Classification Search
CPC ...................................................... C08F 24/00
See application file for complete search history.

(56) References Cited

U.S. PATENT DOCUMENTS 3,308,107 A 3/1967 Selman et al.
3,642,742 A 2/1972 Carlson
(Continued)

FOREIGN PATENT DOCUMENTS

CN 1777962 5/2006
EP 0 271 243 A1 6/1968
(Continued)

OTHER PUBLICATIONS

Japanese Office Action issued Oct. 8, 2024 in Japanese Patent Application No. 2023434648 (with unedited computer-generated English translation), 5 pages (Year: 2024).*

(Continued)

*Primary Examiner* — Catherine S Branch
(74) *Attorney, Agent, or Firm* — Oblon, McClelland, Maier & Neustadt, L.L.P.

(57) ABSTRACT

Resin particles including a unit of formula (1) and having a volume average particle diameter 5 to 2000 μm, a method for producing, and a fluororesin comprising a unit of formula (1) and having a weight average molecular weight $5 \times 10^4$ to $3 \times 10^5$, and a yellow index of a heat-melted molded product (thickness 3 mm) after 24 h at 280° C. of 6 or less, (Continued)

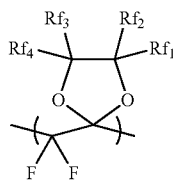

(1)

wherein $Rf_1$, $Rf_2$, $Rf_3$, and $Rf_4$ are independently a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms, and the perfluoroalkyl group may have an ethereal oxygen atom, and $Rf_1$, $Rf_2$, $Rf_3$, and $Rf_4$ may be linked to form a ring having 4 to 8 or carbon atoms.

10 Claims, 4 Drawing Sheets

(30) Foreign Application Priority Data

Feb. 28, 2019 (JP) .................................. 2019-037005
Sep. 20, 2019 (JP) .................................. 2019-171553

(56) References Cited

U.S. PATENT DOCUMENTS

| | | | |
|---|---|---|---|
| 5,408,020 | A | 4/1995 | Hung et al. |
| 2002/0142207 | A1 | 10/2002 | Watakabe et al. |
| 2006/0287497 | A1 | 12/2006 | Tayanagi et al. |
| 2008/0014490 | A1 | 1/2008 | Watakabe et al. |
| 2008/0137025 | A1 | 6/2008 | Veda |
| 2009/0215938 | A1 | 8/2009 | Tayanagi et al. |
| 2009/0292093 | A1 | 11/2009 | Matsuura et al. |
| 2011/0305971 | A1 | 12/2011 | Watakabe et al. |
| 2012/0301813 | A1 | 11/2012 | Watakabe et al. |

FOREIGN PATENT DOCUMENTS

| | | |
|---|---|---|
| EP | 1 220 344 | 7/2002 |
| EP | 1 596 453 | 11/2005 |
| EP | 2 128 150 | 12/2009 |
| EP | 2 821 846 | 1/2015 |
| JP | 48-41942 | 81 12/1973 |
| JP | 63-150308 A | 6/1988 |
| JP | 64-14219 A | 1/1989 |
| JP | 8-157813 A | 6/1994 |
| JP | 7-33807 A | 2/1995 |
| JP | 8-34820 | 2/1996 |
| JP | 43-29154 | 12/1997 |
| JP | 200373544 A * | 3/2003 |
| JP | 2003-268039 A | 9/2003 |
| JP | WO2006/043609 | 4/2006 |
| JP | 200671826 A * | 6/2006 |
| JP | 2006-243719 A | 9/2006 |
| JP | 2007-504125 | 3/2007 |
| JP | WO2014/034581 | 3/2014 |
| JP | 2015-133505 A | 7/2015 |
| JP | 2020-128520 | 8/2020 |
| WO | WO 95/30699 A1 | 11/1995 |
| WO | 9-512854 | 12/1997 |
| WO | WO 2004/097851 | 11/2004 |
| WO | WO 2005/021526 | 3/2005 |
| WO | WO 2014/156996 | 10/2014 |
| WO | WO 2018/147230 | 8/2018 |

OTHER PUBLICATIONS

Notice of Submission of Publications dated Dec. 27, 2022, issued in the corresponding Japanese patent application No. 2019-171553 (with English Translation), 2 pages.
Third Party Observation submitted on Dec. 6, 2022, in the corresponding Japanese patent application No. 2019-171553, 12 pages.
Y. Okamoto et al., "The effect of fluorine substituents on the polymerization mechanism of 2-methylene-1,3-dioxolane and properties of the polymer products", Journal of Fluorine Chemistry 128 (2007) 202-206.
Hamzah M. Beakawi Al-Hashemi et al., "A review on the angle of repose of granular materials", Powder Technology, 330 (2018) 397-417.
Notice of Submission of Publications dated Jul. 27, 2023 issued in the corresponding Japanese patent application No. 2019-037005 with its English machine translation, 2 pages.
Third Party Observation submitted on Jul. 11, 2023 in the corresponding Japanese patent application No. 2019-037005, 12 pages.
Japanese Office Action issued on Jan. 10, 2023 in Japanese Patent Application No. 2019-037005 (with unedited computer-generated English translation), citing document 15 therein, 9 pages.
Japanese Office Action issued on Jan. 10, 2023 in Japanese Application No. 2019-171553 (with unedited computer-generated English translation), 8 pages.
Combined Chinese Office Action and Search Report issued Dec. 22, 2022 in Patent Application No. 201980064085.0 (with English machine translation), 15 pages.
Japanese Notice of Third Party Submission of Publication issued Aug. 9, 2022 in corresponding Japanese Patent Application No. 2019-037005, (with unedited computer generated English translation), 2 pages.
Third Party Observation submitted on Jul. 19, 2022 in the corresponding Japanese patent application No. 2019-037005, citing document 15 therein, 20 pages.
Extended European Search Report issued May 30, 2022 in European Patent Application No. 19864320.7, citing references 1-7 and 15-18 therein, 7 pages.
Combined Chinese Office Action and Search Report issued Mar. 29, 2022, in Chinese Patent Application No. 201980064085.0 (with English translation), citing documents AA and AO therein, 14 pages.
International Search Report and Written Opinion of the International Searching Authority issued Nov. 12, 2019 in PCT/JP2019/038144, citing document AO therein, (with English translation) 20 pages.
International Preliminary Report on Patentability of Chapter I issued Apr. 8, 2021 in PCT/JP2019/038144, (with English translation) 17 pages.
Mikes, F., et al., "Synthesis and Characterization of an Amorphous Perfluoropolymer: Poly(perfluoro-2methylene-4-methyl-1,3-dioxolane)", Macromolecules, 2005, vol. 38, No. 10, pp. 4237-4245.
Hansen, C.M., "Hansen Solubility Parameters: A Users Handbook", CRC Press, 2007, pp. 1-26 with cover pages.
A.bbott, HSP Basics (Year: 2016).
Japanese Office Action issued Jul. 9, 2024 in Japanese Patent Application No. 2023-134648. (with unedited, machine- generated English translation), citing document 15 thersin, 6 pages,.
Notice of Reasons for Refusal issued Mar. 19, 2024 in Japanese Application No. 2023-073965. with English Machine translation, citing document Nos. 15 and 17-19, 5 pgs.
Japanese Office Action issued Feb. 20, 2024 in Japanese Patent Application No. 2019-037005 (with unedited computer-generated English translation), 3 pages.
Liu, W., "Synthesis and Radical Polymerization of Perfluoro-2-methylene-1,3-dioxolanes," Macromolecules, vol. 38, No. 23, Oct. 14, 2005, 8 pages.
Notice of Dispatch of Duplicate of a Written Opposition mailed Dec. 2, 2024 and Patent Opposition Petition dated Nov. 7, 2024, in Japanese Patent No. 7478370 (with English Translation).

* cited by examiner

Example 2-1

Example 2-4

Example 2-5

Comparative example 2-1

Comparative example 2-2

Comparative example 2-3

FLUORORESIN, FLUORORESIN PARTICLES, AND METHODS FOR PRODUCING THESE

CROSS-REFERENCE TO RELATED APPLICATIONS

The present application is a Divisional of U.S. application Ser. No. 17/280,624, filed Mar. 26, 2021, which is the National Stage of International Application No. PCT/JP2019/038144, filed Sep. 27, 2019, which claims priority to Japanese Patent Application No. 2018-183594 filed on Sep. 28, 2018, Japanese Patent Application No. 2019-027318 filed on Feb. 19, 2019, Japanese Patent Application No. 2019-171553 filed on Sep. 20, 2019, and Japanese Patent Application No. 2019-037005 filed on Feb. 28, 2019, and entire contents of all of the above applications are incorporated herein by reference.

TECHNICAL FIELD

The first aspect of the present invention relates to fluororesin particles having excellent flowability and filling property, and to a method for producing the same. The second aspect of the present invention relates to a fluororesin and a method for producing the same.

BACKGROUND ART

Fluororesins have excellent heat resistance, electrical properties, chemical resistance, waterproofness, liquid-repellent and oil-repellent properties, and optical properties, and hence are used for protective films for electronic components such as semiconductors, water-repellent films for inkjet printer heads, and water protection oil coatings for filters, and optical members.

Among them, a fluororesin including an oxolane ring has a bulky ring structure, and therefore is amorphous and has high transparency and high heat resistance. In addition, since such a fluororesin is composed only of carbon, fluorine and oxygen, the fluororesin has high electrical properties, chemical resistance, waterproofness and liquid-repellent oil-repellent properties. Furthermore, since the fluororesin is amorphous, it can be melt-molded.

PTL 1 describes a polymer of perfluoro(2-methylene-4-methyl-1,3-dioxolane (PFMMD)) as a fluororesin including an oxolane ring, and a method for producing the same. Example 2 of PTL 1 describes an example in which a polymer of perfluoro(2-methylene-4-methyl-1,3-dioxolane) is polymerized in the co-presence of nitrogen fluoride ($N_2F_2$) in a glass sealed tube. In this example, no solvent is used, and there is no description of a specific form of the obtained polymer. NPL 1 describes performing bulk polymerization or solution polymerization of PFMMD to obtain a poly-PFMMD, which is a polymer thereof, as a fluororesin including an oxolane ring. In the present description, a resin and a polymer are described as synonymous with each other unless otherwise specified.

[Patent Literature (PTL) 1] U.S. Pat. No. 3,308,107
[Non-Patent Literature (NPL) 1] Macromolecules 2005, 38, 4237 The entire descriptions of PTL 1 and NPL 1 are incorporated herein as if specifically disclosed herein.

SUMMARY OF INVENTION

Technical Problem

NPL 1 indicates that in the case of bulk polymerization, where purification is not performed after the polymerization, optical properties and heat resistance of the described resin are deteriorated and that, however, this deterioration is reduced by purification. In solution polymerization, after polymerization is carried out using either of two types of fluorine-including solvents, chloroform is added for precipitation. There is no description of a specific form of the bulk-polymerized resin after purification or the resin obtained by adding chloroform to cause precipitation.

As a result of the study by the present inventors, it was found that the resins obtained by the methods described in PTL 1 and NPL 1 had an indeterminate non-particulate form. Therefore, there was a problem in flowability of the resin. For example, it has been found that when the resin was melt-molded, there was a problem in handling such as difficulty in continuously supplying the resin to the inside of a molding machine. Further, since the resins described in PTL 1 and Non-PTL 1 have the above-mentioned form, it was established that, for example, when the resin is filled in the molding machine, the resin of a desired weight cannot be filled with respect to a predetermined volume, that is, there is a problem of a low filling property. In this respect, since a container, having a large volume for the weight of the resin, is required, there is also a problem that cost-efficiency is lowered when transporting the article.

Therefore, an object of the first aspect of the present invention is to provide resin particles including a residue unit represented by a general formula (1) that have excellent flowability and filling property, and a method for producing the same, in order to solve the above-mentioned problems.

In addition, the results of further studies by the present inventors have shown that the resin produced by the methods described in PTL 1 and NPL has an indeterminate non-particulate form, and therefore, it is difficult to remove the solvent incorporated inside the resin. In a case where the solvent remains in the resin, the amount of weight loss in heating is large, and there is also a problem that foaming or the like occurs during molding, or the working environment during molding is deteriorated.

Therefore, an object of the first aspect of the present invention is to provide resin particles including a residue unit represented by a general formula (1) that have not only excellent flowability and filling property, but also a small amount of weight loss in heating, and a method for producing the same.

In addition, in the production of a fluororesin, it is generally possible to obtain resin particles by means such as emulsion polymerization and suspension polymerization. However, in these methods, an emulsifier or a dispersant is used as a polymerization aid. However, the emulsifier or dispersant used may become a foreign substance by remaining inside the resin particles, and may further cause coloring when the resin is heated, which may impair transparency and heat resistance. It may be possible that the strict cleanliness required, in recent years, for semiconductor peripheral members could not be satisfied.

Therefore, an object of the first aspect of the present invention is to provide a method for producing resin particles including a residue unit represented by the general formula (1) which are excellent in flowability and filling property, without using an emulsifier and/or a dispersant, and also to provide resin particles including a residue unit represented by the general formula (1), which do not contain an emulsifier and/or a dispersant.

Further, an object of the first aspect of the present invention is to provide resin particles including a residue unit represented by general formula (1) which are not only excellent in flowability and filling property, but also have a small amount of weight loss in heating and do not contain an emulsifier and/or a dispersant, and also to provide a method for producing the resin particles.

Although poly-PFMMD is excellent in heat resistance, according to the study by the present inventors, it has a high melt viscosity, inferior melt molding processability, and also inferior defoaming property at the time of heating and melting, and shows significant yellowing after heating and melting.

Lowering the molecular weight of a polymer is effective in lowering the melt viscosity and improving the melt molding processability. According to NPL 1, the molecular weight can be reduced by using carbon tetrabromide ($CBr_4$) as a chain transfer agent. However, as a result of studies by the present inventors, it has been established that the polymer reduced in molecular weight by using carbon tetrabromide ($CBr_4$) as a chain transfer agent described in NPL 1 has a problem that yellowing after heating and melting is significant.

An object of the second aspect of the present invention is to solve the problems inherent to the fluororesins including the above mentioned oxolane ring, and specifically, to provide a fluororesin including an oxolane ring which is excellent in melt molding processability and in which yellowing after heating and melting is suppressed.

Furthermore, reducing the molecular weight of a polymer also lowers the glass transition temperature. Heat resistance is impaired by lowering the glass transition temperature. In addition, as a result of studies by the present inventors, it has been established that where carbon tetrabromide ($CBr_4$) is used as a chain transfer agent to reduce the molecular weight, there is a problem that cracks occur during cooling after heat molding. Further, in NPL 1, nothing is mentioned about melt viscosity, defoaming property at the time of melting, and crack generation, and the characteristics of the resin that achieves both defoaming property at the time of melting and resistance to crack generation are not clarified, and moreover the characteristics of the resin that satisfies all of the defoaming property at the time of melting, resistance to crack generation, heat resistance, and melt viscosity are not clarified. NPL 1 also describes a polymerization example using a chain transfer agent other than carbon tetrabromide ($CBr_4$), but as a result of the studies by the present inventors, it has been found that such polymerization does not produce a resin excellent in melt molding processability in which yellowing after heating and melting is suppressed. Further, there is no resin that has both defoaming property and resistance to crack generation, and there is no resin that combines all of defoaming property at the time of melting, resistance to crack generation, heat resistance, and melt viscosity.

Further, as a result of studies by the present inventors, it has been established that the polymer reduced in molecular weight by the method using carbon tetrabromide ($CBr_4$) as the chain transfer agent described in NPL 1 had the problems that the amount of weight loss changes significantly during holding at 300° C. for a certain period of time and that thermal decomposition is likely to occur.

An object of the second aspect of the present invention is also to provide a fluororesin which includes an oxolane ring, and which excels in melt molding processability, and in which yellowing after heating and melting is suppressed, and moreover which has low melt viscosity, excellent heat resistance and defoaming property at the time of melting, and shows less cracking during cooling after heat molding.

Solution to Problem

The present inventors have found that novel resin particles including a residue unit represented by a following general formula (1) and having a volume average particle diameter of 5 μm or more and 2000 μm or less have excellent flowability and filling property, and this has led to the completion of the first aspect of the present invention.

[C1]

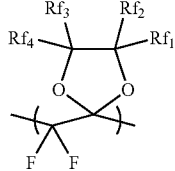

(1)

In the formula (1), $Rf_1$, $Rf_2$, $Rf_3$, and $Rf_4$ are each independently one of the groups consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms. The perfluoroalkyl group may have an ethereal oxygen atom. Further, $Rf_1$, $Rf_2$, $Rf_3$, and $Rf_4$ may be linked to one another to form a ring having 4 or more and 8 or less carbon atoms, and the ring may include an ethereal oxygen atom.

Furthermore, the present inventors have found that by using a precipitation polymerization method, resin particles can be obtained without using an emulsifier or a dispersant, that the resin particles obtained without using an emulsifier or a dispersant do not contain an emulsifier or a dispersant and retain the original transparency and heat resistance of the resin, and that resin particles, inside which no solvent remains and which have a small amount of weight loss in heating, can be obtained, and thus have arrived at a preferred embodiment of the first aspect of the present invention.

The first aspect of the present invention is as follows.
[1-1]
The resin particles including a residue unit represented by the following general formula (1) and having a volume average particle diameter equal to or more than 5 μm and equal to or less than 2000 μm.

[C2]

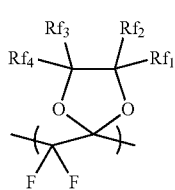

(1)

(In the formula (1), $Rf_1$, $Rf_2$, $Rf_3$, and $Rf_4$ are each independently one of the groups consisting of a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms. The perfluoroalkyl group may have an ethereal oxygen atom. Further, $Rf_1$, $Rf_2$, $Rf_3$, and $Rf_4$ may be linked to one another to form a ring having 4 or more and 8 or less carbon atoms, and the ring may include an ethereal oxygen atom).
[1-2]
The resin particles according to [1-1], wherein the volume average particle diameter is equal to or more than 5 μm and equal to or less than 500 μm.

[1-3]

The resin particles according to [1-1] or [1-2], wherein an angle of repose is equal to or more than 5° and equal to or less than 60°.

[1-4]

The resin particles according to any one of [1-1] to [1-3], wherein the resin particles are a precipitation polymerization polymer.

[1-5]

The resin particles according to any one of [1-1] to [1-4], wherein a bulk density is equal to or more than 0.2 g/mL and equal to or less than 1.5 g/mL.

[1-6]

The resin particles according to any one of [1-1] to [1-5], wherein the amount of weight loss in heating at 250° C. is equal to or less than 1% by weight.

[1-7]

The resin particles according to any one of [1-1] to [1-6], wherein the resin particles do not contain an emulsifier and/or a dispersant.

[1-8]

The resin particles according to any one of [1-1] to [1-7], wherein the residue unit represented by the general formula (1) is a perfluoro(4-methyl-2-methylene-1,3-dioxolane) residue unit represented by a general formula (2).

[C3]

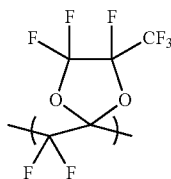

(2)

[1-9]

A method for producing the resin particles according to any one of [1-1] to [1-7], the method comprising:
  a step of obtaining a resin including a residue unit represented by a general formula (4) by placing a mixture of a radical polymerization initiator, a monomer represented by a following general formula (3) and an organic solvent under polymerization conditions, wherein
  the organic solvent is a solvent in which at least the monomer is dissolved, at least a part of the resin produced by the polymerization is not dissolved, and precipitation of the resin occurs; and
  the resin produced by the polymerization precipitates as particles in the organic solvent.

[C4]

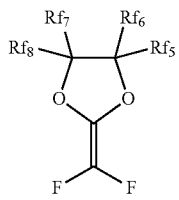

(3)

(In the formula (3), $Rf_5$, $Rf_6$, $Rf_7$, and $Rf_8$ are each independently one of the groups consisting of a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms. The perfluoroalkyl group may have an ethereal oxygen atom. Further, $Rf_5$, $Rf_8$, $Rf_7$, and $Rf_8$ may be linked to one another to form a ring having 4 or more and 8 or less carbon atoms, and the ring may include an ethereal oxygen atom).

[C5]

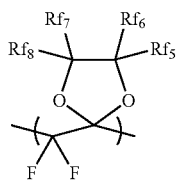

(4)

(Definitions of $Rf_5$, $Rf_6$, $Rf_7$, and $Rf_8$ in the formula (4) are the same as definitions of $Rf_5$, $Rf_6$, $Rf_7$, and $Rf_8$ in the formula (3), respectively.)

[1-10]

The production method according to [1-9], wherein the organic solvent is an organic solvent dissolving the monomer represented by the general formula (3) and does not dissolve the resin including a residue unit represented by the general formula (4).

[1-11]

The production method according to [1-10], wherein the organic solvent is an organic solvent in which after resin particles including a residue unit represented by the general formula (4) and having a weight average molecular weight Mw of $5 \times 10^4$ to $70 \times 10^4$ have been immersed at 50° C. for 5 h or more in the organic solvent in an amount 10 times (w/w) that of the organic particles, a residue of the resin particles is visually confirmed in the organic solvent.

[1-12]

The production method according to [1-10] or [1-11], wherein the organic solvent is an organic solvent in which resin particles including a residue unit represented by the general formula (4) and having a weight average molecular weight Mw of $5 \times 10^4$ to $70 \times 10^4$ are immersed at 50° C. for 5 h or more in the organic solvent in an amount 10 times (w/w) that of the organic particles, the solvent is thereafter cooled to 25° C., a resin sample remaining in a solid state is recovered, and a weight loss ratio of the resin sample is less than 20% by weight.

[1-13]

The production method according to any one of [1-9] to [1-12], wherein an organic solvent comprising a fluorine atom and a hydrogen atom in a molecule is used.

[1-14]

The production method according to [1-13], wherein the organic solvent having a hydrogen atom amount equal to or more than 1% by weight in the solvent molecule is used.

[1-15]

The manufacturing method according to any one of [1-9] to [1-14], wherein the monomer represented by the general formula (3) is perfluoro(4-methyl-2-methylene-1,3-dioxolane) represented by a general formula (5), and the residue unit represented by the general formula (4) is a perfluoro (4-methyl-2-methylene-1,3-dioxolane) residue unit represented by a general formula (6).

[C6]

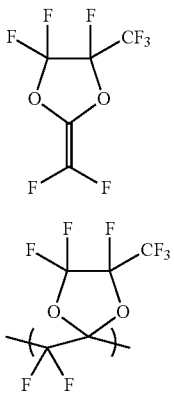

(5)

(6)

The second aspect of the present invention is as follows.

[2-1]

A fluororesin comprising a residue unit represented by a general formula (1) and having a weight average molecular weight Mw in a range of $5\times10^4$ to $3\times10^5$, and a yellow index of a heat-melted molded product (thickness 3 mm) after 24 h at 280° C. of equal to or less than 6.

[C7]

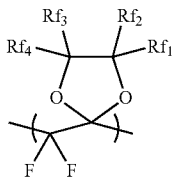

(1)

In the formula (1), $Rf_1$, $Rf_2$, $Rf_3$, and $Rf_4$ are each independently one of the group consisting of a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms, the perfluoroalkyl group may have an ethereal oxygen atom, $Rf_1$, $Rf_2$, $Rf_3$, and $Rf_4$ may be linked to one another to form a ring having 4 or more and 8 or less carbon atoms, and the ring may include an ethereal oxygen atom.

[2-2]

The fluororesin according to [2-1], wherein a glass transition temperature is equal to or higher than 125° C. and equal to or lower than 145° C.

[2-3]

The fluororesin according to [2-1] or [2-2], wherein a melt viscosity at a shear rate of $10^{-2}$ s and 250° C. is $1\times10^2$ to $3\times10^5$ Pa·s.

[2-4]

The fluororesin according to any one of [2-1] to [2-3], which has a molecular weight distribution Mw/Mn of 1.2 to 8.

[2-5]

The fluororesin according to any one of [2-1] to [2-4], wherein the number of cracks in the heat-melted molded product (thickness 3 mm, diameter 26.4 mm) after 24 h at 280° C. is equal to or less than 10.

[2-6]

The fluororesin according to any one of [2-1] to [2-5], wherein a difference B-A between an amount A of weight loss immediately after the temperature is raised to 300° C. at 10° C./min in air in TG-DTA and an amount B of weight loss after the temperature is raised to 300° C. and then held at 300° C. for 30 min is equal to or less than 1.0%.

[2-7]

The fluororesin according to any one of [2-1] to [2-6], wherein an area occupied by bubbles in the heat-melted molded product (thickness 3 mm, diameter 26.4 mm) after 24 h at 280° C. is equal to or less than 10% relative to an area of the molded product.

[2-8]

The fluororesin according to any one of [2-1] to [2-7], wherein the number of bubbles in the heat-melted molded product (thickness 3 mm, diameter 26.4 mm) after 24 h at 280° C. is 10 or less.

[2-9]

The fluororesin according to any one of [2-1] to [2-8], wherein the weight average molecular weight Mw is in a range of $5\times10^4$ to $2\times10^5$.

[2-10]

The fluororesin according to any one of [2-1] to [2-9], wherein a melt viscosity at a shear rate of $10^{-2}$ s and 250° C. is $1\times10^2$ to $5\times10^4$ Pa·s.

[2-11]

The fluororesin according to any one of [2-1] to [2-10], including a residue unit represented by a following general formula (2).

[C8]

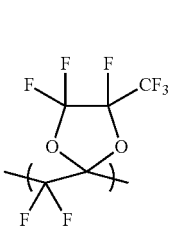

(2)

[2-12]

A method for producing a fluororesin, the method comprising obtaining a fluororesin that includes a residue unit represented by a following general formula (4) by polymerizing a monomer represented by a following general formula (3) in the presence of a radical polymerization initiator and a chain transfer agent, wherein the chain transfer agent is an organic compound having 1 to 20 carbon atoms and including at least one atom selected from the group consisting of a hydrogen atom and a chlorine atom, and the fluororesin has a weight average molecular weight Mw in a range of $5\times10^4$ to $3\times10^5$ and has a yellow index of a heat-melted molded product (thickness 3 mm) after 24 h at 280° C. of equal to or less than 6.

[C9]

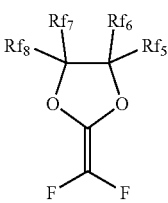

(3)

-continued

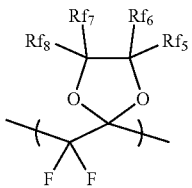

(4)

(In the formula (3), $Rf_5$, $Rf_6$, $Rf_7$, and $Rf_8$ are each independently one of the group consisting of a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms, the perfluoroalkyl group may have an ethereal oxygen atom, $Rf_5$, $Rf_6$, $Rf_7$, and $Rf_e$ may be linked to one another to form a ring having 4 or more and 8 or less carbon atoms, and the ring may include an ethereal oxygen atom).

[2-13]

The production method according to [2-12], wherein an amount of the chain transfer agent is 3% by weight to 50% by weight based on a total amount of the monomer and the chain transfer agent.

[2-14]

The production method according to [2-12] or [2-13], wherein the polymerization is carried out in an organic solvent that dissolves the monomer represented by the general formula (3) and precipitates the fluororesin including a residue unit represented by the general formula (4).

[2-15]

The production method according to any one of [2-12] to [2-14], wherein the chain transfer agent is an organic compound having 1 to 20 carbon atoms and including a chlorine atom.

[2-16]

The production method according to any one of [2-12] to [2-15], wherein the chain transfer agent is an organic compound having 1 to 20 carbon atoms and including a chlorine atom and a hydrogen atom.

Advantageous Effects of Invention

According to the first aspect of the present invention, it is possible to provide fluororesin particles having excellent flowability and filling property and a method for producing the fluororesin particles.

Further, according to the first aspect of the present invention, it is possible to provide resin particles which are not only excellent in flowability and filling property but also do not contain an emulsifier or a dispersant, and a method for producing the same, and also provide resin particles which are not only excellent in flowability and filling property but also have a small amount of weight loss in heating, and a method for producing the same.

According to the second aspect of the present invention, it is possible to provide a fluororesin including an oxolane ring, which is excellent in heat resistance and melt molding processability and in which yellowing after heating and melting is suppressed. Further, according to the second aspect of the present invention, it is possible to provide a fluororesin including an oxolane ring, which excels in heat resistance and melt molding processability, in which yellowing after heating and melting is suppressed, and which also has low melt viscosity, excellent defoaming property at the time of melting, and shows less cracking during cooling after heat molding.

BRIEF DESCRIPTION OF DRAWINGS

FIG. 1-2 shows a particle diameter distribution of resin particles produced in Example 1-4.

FIG. 2-1 is a photograph of the fluororesin of Example 2-1 after heating at 280° C. for 24 h, melting and cooling.

FIG. 2-2 is a photograph of the fluororesin of Example 2-4 after heating at 280° C. for 24 h, melting and cooling.

FIG. 2-3 is a photograph of the fluororesin of Example 2-5 after heating at 280° C. for 24 h, melting and cooling.

FIG. 2-4 is a photograph of the fluororesin of Comparative Example 2-1 after heating at 280° C. for 24 h, melting and cooling.

FIG. 2-5 is a photograph of the fluororesin of Comparative Example 2-2 after heating at 280° C. for 24 h, melting and cooling.

FIG. 2-6 is a photograph of the fluororesin of Comparative Example 2-3 after heating at 280° C. for 24 h, melting and cooling.

DESCRIPTION OF EMBODIMENTS

Figure 1:
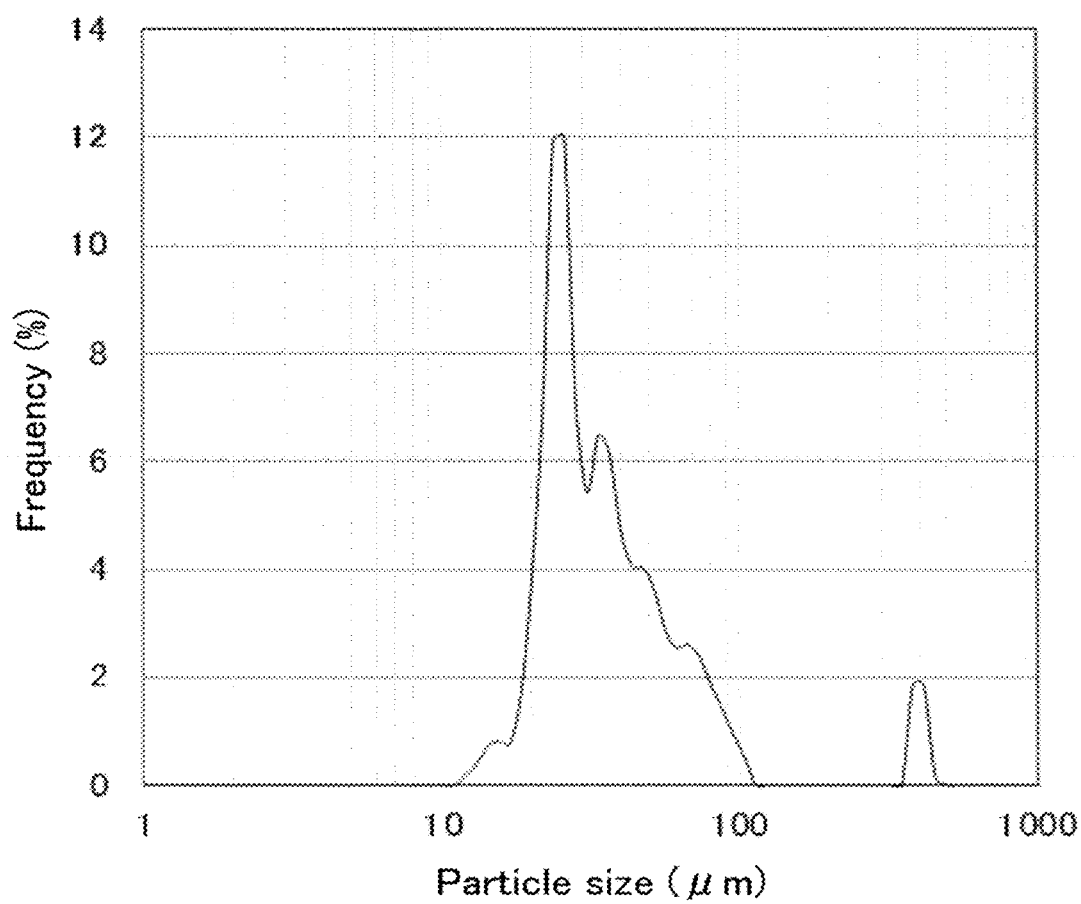
FIG. 1-1 shows a particle diameter distribution of resin particles produced in Example 1-1.
Figures 1, 2:
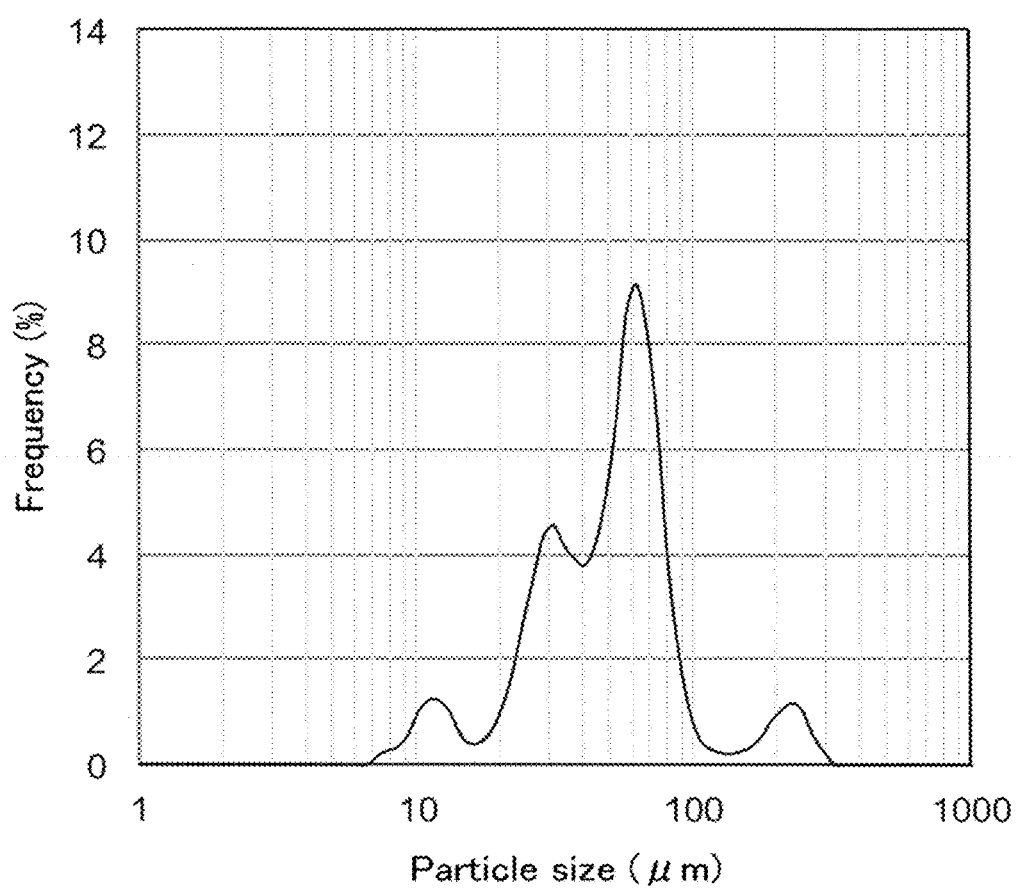
Figures 1, 2:
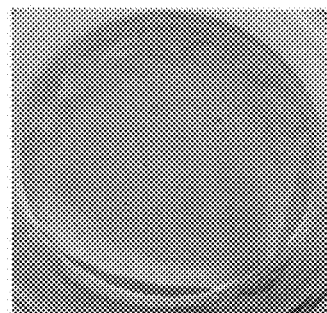
Figure 2:
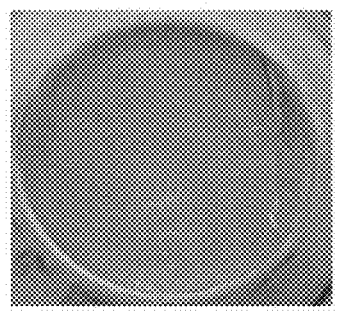
Figures 2, 3:
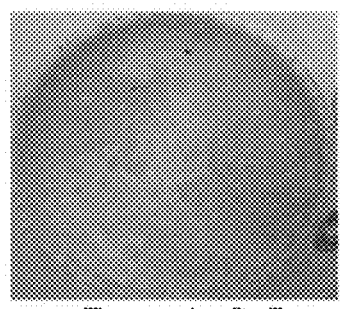
Figures 2, 3, 4:
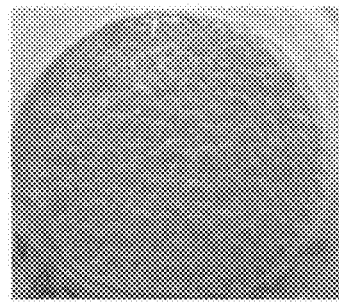
Figures 2, 3, 4, 5:
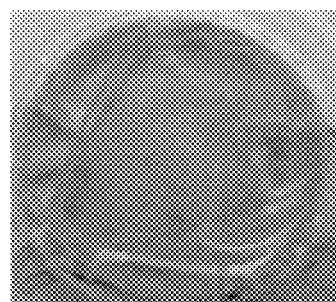
Figures 2, 3, 4, 5, 6:
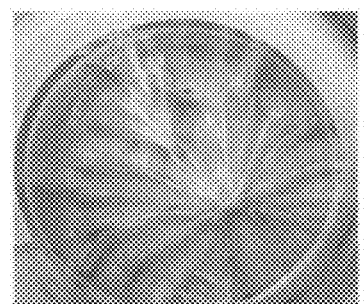

The first aspect of the present invention will be described in detail below.

The first aspect of the present invention is resin particles including a residue unit represented by the general formula (1). Since the fluororesin particles of the present invention have a bulky ring structure included in the general formula (1), the fluororesin particles are amorphous and have high transparency and high heat resistance. Moreover, since the fluororesin particles are composed only of carbon, fluorine and oxygen, the fluororesin particles have high electrical properties, chemical resistance, waterproofness and liquid-repellent oil-repellent property.

The $Rf_1$, $Rf_2$, $Rf_3$, and $Rf_4$ groups in the residual unit represented by the general formula (1) in the first aspect of the present invention are each independently one of the group consisting of a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms. The perfluoroalkyl group may have an ethereal oxygen atom. Further, $Rf_1$, $Rf_2$, $Rf_3$, and $Rf_4$ may be linked to one another to form a ring having 4 or more and 8 or less carbon atoms, and the ring may include an ethereal oxygen atom.

Examples of the linear perfluoroalkyl group having 1 to 7 carbon atoms include a trifluoromethyl group, a pentafluoroethyl group, a heptafluoropropyl group, a nonafluorobutyl group, an undecafluoropentyl group, a tridecafluorohexyl group, and a pentadecafluoroheptyl group; examples of the branched perfluoroalkyl group having 3 to 7 carbon atoms include a heptafluoroisopropyl group, a nonafluoroisobutyl group, a nonafluorosec-butyl group, and a nonafluorotert-butyl group; and examples of the cyclic perfluoroalkyl group having 3 to 7 carbon atoms include a heptafluorocyclopropyl group, a nonafluorocyclobutyl group, and a tridecafluorocyclohexyl group. Examples of the linear perfluoroalkyl group which has 1 to 7 carbon atoms and may have an ethereal oxygen atom include a —$CF_2OCF_3$ group, a-$(CF_2)_2OCF_3$ group, and a —$(CF_2)_2OCF_2CF_3$ group; examples of the cyclic perfluoroalkyl group which has 3 to 7 carbon atoms and may have an ethereal oxygen atom include a 2-(2,3,3,4,4,5,5,6,6-decafluoro)-pyrinyl group, a 4-(2,3,3,4,4,5,5,6,6-decafluoro)-pyrinyl group, and a 2-(2,3,3,4,4,5,5-heptafluoro)-furanyl group.

In order to obtain excellent heat resistance, it is preferable that at least one of $Rf_1$, $Rf_2$, $Rf_3$ and $Rf_4$ be one of the group consisting of a linear perfluoroalkyl group having 1 to 7 carbon atoms, a branched perfluoroalkyl group having 3 to 7 carbon atoms, and a cyclic perfluoroalkyl group having 3 to 7 carbon atoms.

Examples of the residue unit represented by the general formula (1) include the following residue units.

[C10]

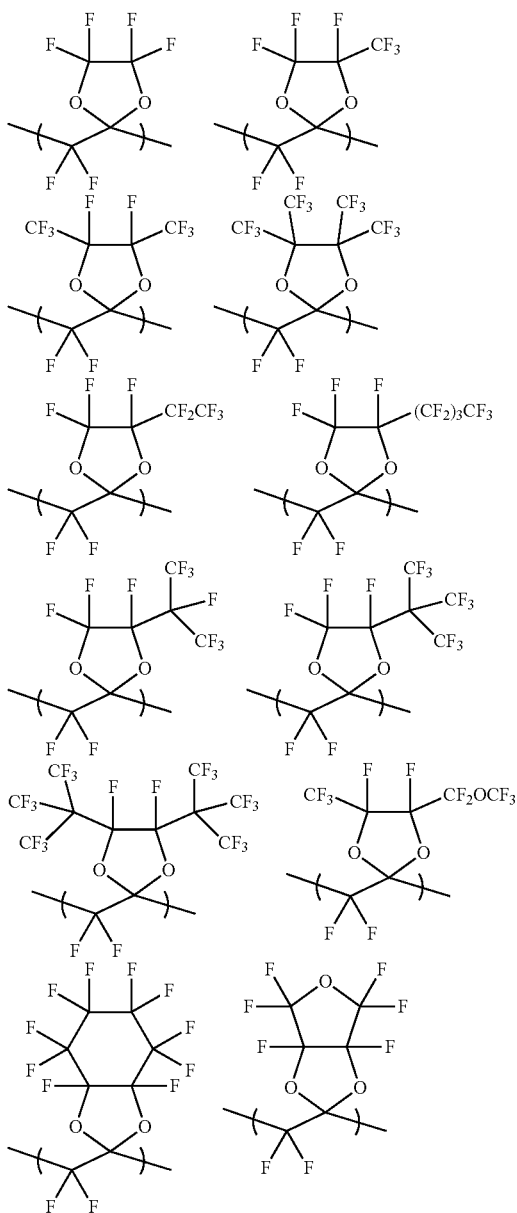

Among these, resin particles including the following residue units are preferable because they are excellent in heat resistance and molding processability, and a resin including perfluoro(4-methyl-2-methylene-1,3-dioxolane) residue unit represented by the formula (2) is more preferable.

[C11]

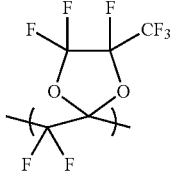

(2)

As a result of having the volume average particle diameter of 5 μm or more and 2000 μm or less, the resin particles of the present invention have high flowability and can be continuously supplied to a molding machine or the like. The volume average particle diameter is preferably 5 μm or more and 1000 μm or less. Further, since the volume average particle diameter is in the above range, the solvent can be prevented from remaining in the resin particles, so that the amount of weight loss in heating is small. The solvent can also remain in the resin particles when the resin particles are obtained by the precipitation polymerization method described hereinbelow.

It is more preferable that the resin particles of the present invention have a volume average particle diameter of 5 μm or more and 500 μm or less. As a result of the volume average particle diameter being in this range, a higher flowability is obtained, continuous supply to a molding machine or the like is facilitated, and the amount of weight loss in heating is also reduced. Further, the filling property is increased as compared with the resin obtained by the method described in NPL 1, and the resin can be efficiently stored in a container. Where the volume average particle diameter is 5 μm or more, the particles are unlikely to be scattered by an air flow, and the handleability of the resin particles of the present invention is improved. Further, it is preferable that the volume average particle diameter be 500 μm or less because the resin particles can be melted in a shorter time and the efficiency of the molding process is improved.

The 90% particle diameter of the resin particles of the present invention is preferably 2500 μm or less, more preferably 2000 μm or less, and further preferably 1000 μm or less. As a result, in the resin particles of the present invention, the amount of coarse particles is lowered, and the flowability and moldability are further improved.

Further, the resin particles of the present invention preferably have a 10% particle diameter of 3 μm or more. As a result, in the resin particles of the present invention, the amount of fine particles is lowered, dusting is further prevented, and flowability is further improved.

The volume average particle diameter, 90% particle diameter, 10% particle diameter, and particle diameter distribution of the resin particles of the present invention can be evaluated by particle diameter distribution measurement (volume distribution) by a laser diffraction scattering method. The particle diameter distribution by the laser diffraction/scattering method is measured after the resin particles are dispersed in water or an organic solvent such as methanol and, if necessary, treated with an ultrasonic homogenizer to homogenize the dispersed state of the particles, whereby quantification can be performed with good reproducibility. As a laser scattering meter, MICROTRACK manufactured by Microtrack Bell Co., Ltd. can be exemplified.

The volume average particle diameter is also called a Mean Volume Diameter, which is an average particle diameter expressed on a volume basis. The particle diameter distribution is divided for each particle diameter channel, and assuming that the representative particle diameter value of each particle diameter channel is d, and the volume-based percentage for each particle diameter channel is v, the volume average particle diameter is represented by $\Sigma(vd)/\Sigma(v)$.

The 10% particle diameter represents the particle diameter at a point where the cumulative amount is 10% when the cumulative amount is calculated with the total volume of the powder group as 100%. The 90% particle diameter represents the particle diameter at a point where the cumulative amount is 90% when the cumulative amount is calculated with the total volume of the powder group as 100%.

The resin particles of the present invention preferably do not include an emulsifier and/or a dispersant. As a result of not including an emulsifier and/or a dispersant, the resin and resin particles having excellent transparency and heat resistance can be obtained. Resin particles including no emulsifier and/or dispersant can be produced by using a precipitation polymerization method described hereinbelow. Therefore, the resin particles of the present invention are preferably a precipitated polymer. Here, the dispersant is an agent having a function of dispersing resin particles in a solvent, and examples thereof include polyvinyl alcohol, methyl cellulose, hydroxypropyl methyl cellulose, hydroxyethyl methyl cellulose, and the like. The emulsifier is an agent having a function of emulsifying resin particles in a solvent, and examples thereof include fluorine-including surfactants such as sodium perfluorooctanate, sodium perfluorooctane sulfonate, ammonium perfluorooctanate, and the like; fluorine-free surfactants such as sodium lauryl sulfate, ethylene glycol-based polymers, and the like; and the like.

The bulk density of the resin particles of the present invention is preferably 0.2 g/cm³ or more and 1.5 g/cm³ or less from the viewpoint of obtaining filling property. The bulk density can be measured by the method described in Examples described hereinbelow.

The resin particles of the present invention may include other monomer residue units, and examples of the other monomer residue units include tetrafluoroethylene (TFE), hexafluoropropylene (HFP), and chlorotrifluoroethylene (CTFE), trifluoroethylene, hexafluoroisobutylene, perfluoroalkylethylene, fluorovinyl ether, vinyl fluoride (VF), vinylidene fluoride (VDF), perfluoro-2,2-dimethyl-1,3-dioxol (PDD), perfluoro(allyl vinyl ether), perfluoro(butenyl vinyl ether), and the like.

The resin particles of the present invention preferably have an angle of repose of 5° or more and 60° or less. As a result, the flowability of the resin particles becomes higher, and continuous supply to a molding machine or the like is facilitated. The angle of repose is more preferably 5° or more and 40° or less, and further preferably 10° or more and 40° or less.

Here, the angle of repose refers to an angle formed by the ridgeline of a flat surface and a resin powder when the powder is deposited on the flat surface. The angle of repose can be evaluated by filling a container with resin powder, letting it fall naturally, and measuring the angle formed by the resin powder that is piled up when deposited on a horizontal plane. A specific method for measuring the angle of repose will be described in Examples described hereinbelow.

In the first aspect of the present invention, there is no limitation on the molecular weight of the resin of the resin particles, and the weight average molecular weight measured by gel permeation chromatography (GPC) is, for example, 2,500 to 2,000,000 or the like. From the viewpoint of the melt viscosity of the resin and the mechanical strength, the weight average molecular weight is preferably 10,000 to 1,000,000 (g/mol). At the time of measurement, polymethyl methacrylate is used as a standard sample, and the weight average molecular weight in terms of polymethyl methacrylate is calculated from the elution time of the resin of the resin particles and the standard sample.

Next, a method for producing resin particles according to the first aspect of the present invention will be described.

The resin particles of the first aspect of the present invention can be produced, for example, by a method including a step of subjecting a mixture of a radical polymerization initiator, a monomer represented by the following general formula (3), and an organic solvent to polymerization conditions to obtain a resin including a residue unit represented by the general formula (4).

[C12]

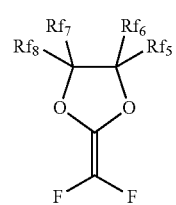

(3)

In the formula (3), $Rf_5$, $Rf_8$, $Rf_7$, and $Rf_8$ are the same as $Rf_1$, $Rf_2$, $Rf_3$, and $Rf_4$, respectively, in the formula (1).

[C13]

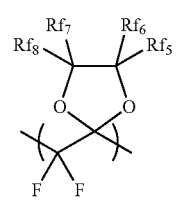

(4)

In the formula (4), $Rf_5$, $Rf_6$, $Rf_7$, and $Rf_8$ are the same as $Rf_1$, $Rf_2$, $Rf_3$, and $Rf_4$, respectively, in the formula (1).

In the method for producing resin particles of the present invention, the organic solvent dissolves the monomer represented by the general formula (3), does not dissolve at least a part of the resin including the residue unit represented by the general formula (4) generated by polymerization, and causes precipitation of the resin. The resin produced by the polymerization precipitates as particles in the organic solvent. The organic solvent used in the method for producing the resin particles of the present invention may be referred to as a "precipitation polymerization solvent". More specifically, the precipitation polymerization solvent can be an organic solvent that dissolves the monomer represented by the general formula (3) and does not dissolve the resin including the residue unit represented by the general formula (4). This precipitation polymerization solvent is hereinafter referred to as precipitation polymerization solvent A. In the present invention, by using a precipitation polymerization solvent, the resin generated by the polymerization reaction can be precipitated as particles having a specific volume average particle diameter, and as a result, resin particles having excellent moldability and filling property can be produced. Further, since a polymerization aid such as an emulsifier and a dispersant is not used, resin particles that do not contain an emulsifier and a dispersant that cause a decrease in transparency and heat resistance can be produced.

Here, the precipitation polymerization solvent A means a solvent in which resin particles remain after the resin particles including the residue unit represented by the general formula (4) have been immersed in the organic solvent for a long time. Specifically, the organic solvent can be regarded as the precipitation polymerization solvent A when the remainder of resin particles can be visually confirmed in the organic solvent after resin particles having a weight average molecular weight Mw of $5 \times 10^4$ to $70 \times 10^4$ and including a residue unit represented by the general formula (4) have been immersed in the organic solvent at 50° C. for 5 h or more. It is preferable that the precipitation polymerization solvent A be an organic solvent such that the weight loss ratio of a resin sample is less than 20% by weight when the solution is cooled to 25° C. after the immersion at 50° C. for 5 h or more, and then the resin sample remaining in a solid state is recovered. The weight loss ratio of the resin sample is more preferably less than 12% by weight, and still more preferably less than 10% by weight.

The loss ratio of resin weight can be measured by the following method. After filtering the above cooled solution with a filter, the solid on the filter is rinsed with the solvent, washed with acetone a plurality of times and then dried, and the resin sample on the filter is recovered. The weight of the recovered resin is measured, and the 100 percentage of the value obtained by dividing the value obtained by subtracting the weight of the recovered resin from the amount of resin immersed in the organic solvent by the amount of resin immersed in the organic solvent is taken as the resin loss ratio.

Examples of the precipitation polymerization solvent include non-halogen organic solvents such as acetone, methyl ethyl ketone, hexane, and butyl acetate, chlorine-containing organic solvents such as dichloromethane and chloroform, and organic solvents including a fluorine atom in the molecule.

Further, as the precipitation polymerization solvent, an organic solvent including a fluorine atom and a hydrogen atom in the molecule is preferable because a chain transfer reaction is unlikely to occur in radical polymerization, the polymerization yield is excellent, and a high molecular weight substance can be easily obtained. Specific examples of the precipitation polymerization solvent including fluorine atom and hydrogen atom in the molecule include 1,1,2,2-tetrafluoroethyl-2,2,2-trifluoroethyl ether, 2,2,2-trifluoroethanol, 1,1,1,3,3,3-hexafluoroisopropanol, 1,2,2,3,3,4,4-heptafluorocyclopentane, 1H,1H-pentafluoropropanol, 1H,1H-heptafluorobutanol, 2-perfluorobutylethanol, 4,4,4-trifluorobutanol, 1H,1H,3H-tetrafluoropropanol, 1H,1H,5H-octafluoropropanol, 1H,1H,7H-dodecafluoroheptanol, 1H,1H,3H-hexafluorobutanol, 2,2,3,3,3-pentafluoropropyl difluoromethyl ether, 2,2,3,3,3-pentafluoropropyl-1,1,2,2-tetrafluoroethyl ether, 1,1,2,2-tetrafluoroethylethyl ether, 1,1,2,2-tetrafluoroethyl-2,2,3,3-tetrafluoropropyl ether, hexafluoroisopropylmethyl ether, 1,1,3,3,3-pentafluoro-2-trifluoromethylpropylmethyl ether, 1,1,2,3,3,3-hexafluoropropylmethyl ether, 1,1,2,3,3,3-hexafluoropropylethyl ether, 2,2,3,4,4,4-hexafluorobutyldifluoromethyl ether, and the like.

Among them, 1,1,2,2-tetrafluoroethyl-2,2,2-trifluoroethyl ether, 2,2,2-trifluoroethanol, 1,1,1,3,3,3-hexafluoroisopropanol, and 1,2,2,3,3,4,4-heptafluorocyclopentane are preferable, and 1,2,2,3,3,4,4-heptafluorocyclopentane is preferred since the polymerization yield is excellent and a high molecular weight substance can be easily obtained. The ratio of fluorine atoms and hydrogen atoms in the molecule of the precipitation polymerization solvent is preferably fluorine atoms:hydrogen atoms=1:9 to 9:1, more preferably 1:9 to 7:3, and even more preferably 4:6 to 7:3 in terms of the number of atoms, because the polymerization yield is excellent.

The precipitation polymerization solvent preferably includes a fluorine atom and a hydrogen atom in the molecule because an excellent polymerization yield is obtained, and the amount of the hydrogen atom in the solvent is preferably 1% by weight or more, and more preferably 1.5% by weight or more based on the weight of the solvent molecule. Further, the amount of the hydrogen atom in the solvent is preferably 1% by weight or more and 5% by weight or less, and preferably 1.5% by weight or more and 4% by weight or less since the polymerization yield is excellent and a high molecular weight substance can be easily obtained. Moreover, the precipitation polymerization solvent preferably does not include a chlorine atom in the molecule since the polymerization yield is excellent and a high molecular weight substance can be easily obtained.

As for the ratio of the monomer represented by the general formula (3) to the precipitation polymerization solvent, the monomer:precipitation polymerization solvent ratio, in terms of weight ratio, is preferably 1:99 to 50:50, more preferably 5:95 to 40:60, and even more preferably 5:95 to 30:70 because excellent productivity is achieved and particles having excellent flow characteristics can be obtained.

Examples of the radical polymerization initiator for performing radical polymerization include organic peroxides such as benzoyl peroxide, lauryl peroxide, octanoyl peroxide, acetyl peroxide, di-tetr-butyl peroxide, tetr-butylcumyl peroxide, and dicumyl peroxide, tetr-butyl peroxyacetate, perfluoro(di-tetr-butyl peroxide), bis(2,3,4,5,6-pentafluorobenzoyl) peroxide, and tetr-butyl peroxybenzoate, and tetr-butyl perpivalate; and azo-based initiators such as 2,2'-azobis(2,4-dimethylvaleronitrile), 2,2'-azobis(2-butyronitrile), 2,2'-azobisisobutyronitrile, dimethyl-2,2'-azobisisobutyrate, and 1,1'-azobis(cyclohexane-1-carbonitrile).

In the production method of the present invention, it is preferable that the monomer represented by the general formula (3) be perfluoro(4-methyl-2-methylene-1,3-dioxolane) represented by the general formula (5), and the residue unit represented by the general formula (4) be a perfluoro(4-methyl-2-methylene-1,3-dioxolane) residue unit represented by the general formula (6).

[C14]

(5)

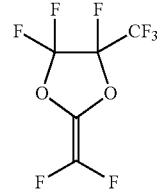

-continued (6)

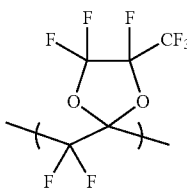

Since the resin particles of the present invention are resin particles that are unlikely to foam during molding, the amount of weight loss in heating at 250° C. is preferably 1% by weight or less, and preferably 0.5% by weight or less. Further, the minimum amount of weight loss in heating at 250° C. is not particularly limited, and can be exemplified by 0.001% by weight or more. Further, since the resin particles of the present invention are resin particles that are unlikely to foam during molding, the residual solvent amount contained in the resin is preferably 1% by weight or less, and preferably 0.5% by weight or less. Here, the amount of weight loss in heating at 250° C. indicates the amount of weight loss at 250° C. when the temperature is raised from 40° C. at 10° C./min under an air stream using TG-DTA and is found from (1−(sample weight at 250° C.)/(weighed sample weight))×100).

The second aspect of the present invention will be described in detail below. The second aspect of the present invention relates to a fluororesin including a residue unit represented by the following general formula (1), in which a weight average molecular weight Mw is in the range of $5\times10^4$ to $3\times10^5$, and a yellow index of a heat-melted molded product (thickness of 3 mm) after heating for 24 h at 280° C. is 6 or less.

[C15]

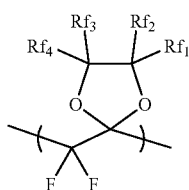

(1)

In the formula (1), $Rf_1$, $Rf_2$, $Rf_3$, and $Rf_4$ are each independently one of the groups consisting of a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms. The perfluoroalkyl group may have an ethereal oxygen atom. Further, $Rf_1$, $Rf_2$, $Rf_3$, and $Rf_4$ may be linked to one another to form a ring having 4 or more and 8 or less carbon atoms, and the ring may include an ethereal oxygen atom.

The second aspect of the present invention is a fluororesin including a residue unit represented by the specific general formula (1). Since the fluororesin of the present invention has a bulky ring structure included in the specific general formula (1), the fluororesin is amorphous and has high transparency and high heat resistance. Moreover, since the fluororesin is composed only of carbon, fluorine and oxygen, the fluororesin has high electrical properties, chemical resistance, waterproofness and liquid-repellent oil-repellent property.

The $Rf_1$, $Rf_2$, $Rf_3$, and $Rf_4$ groups in the residual unit represented by the general formula (1) in the second aspect of the present invention are each independently one of the group consisting of a fluorine atom, a linear perfluoroalkyl group having 1 to 7 carbon atoms, a branched perfluoroalkyl group having 3 to 7 carbon atoms, or a cyclic perfluoroalkyl group having 3 to 7 carbon atoms. The perfluoroalkyl group may have an ethereal oxygen atom. Further, $Rf_1$, $Rf_2$, $Rf_3$, and $Rf_4$ may be linked to one another to form a ring having 4 or more and 8 or less carbon atoms, and the ring may include an ethereal oxygen atom.

Examples of the linear perfluoroalkyl group having 1 to 7 carbon atoms include a trifluoromethyl group, a pentafluoroethyl group, a heptafluoropropyl group, a nonafluorobutyl group, an undecafluoropentyl group, a tridecafluorohexyl group, and a pentadecafluoroheptyl group; examples of the branched perfluoroalkyl group having 3 to 7 carbon atoms include a heptafluoroisopropyl group, a nonafluoroisobutyl group, a nonafluorosec-butyl group, and a nonafluorotert-butyl group; and examples of the cyclic perfluoroalkyl group having 3 to 7 carbon atoms include a heptafluorocyclopropyl group, a nonafluorocyclobutyl group, and a tridecafluorocyclohexyl group. Examples of the linear perfluoroalkyl group which has 1 to 7 carbon atoms and may have an ethereal oxygen atom include a —$CF_2OCF_3$ group, a-$(CF_2)_2OCF_3$ group, and a —$(CF_2)_2OCF_2CF_3$ group; examples of the cyclic perfluoroalkyl group which has 3 to 7 carbon atoms and may have an ethereal oxygen atom include a 2-(2,3,3,4,4,5,5,6,6-decafluoro)-pyrinyl group, a 4-(2,3,3,4,4,5,5,6,6-decafluoro)-pyrinyl group, and a 2-(2,3,3,4,4,5,5-heptafluoro)-furanyl group.

From the viewpoint of showing excellent heat resistance, it is preferable that at least one of $Rf_1$, $Rf_2$, $Rf_3$ and $Rf_4$ be one of the group consisting of a linear perfluoroalkyl group having 1 to 7 carbon atoms, a branched perfluoroalkyl group having 3 to 7 carbon atoms, and a cyclic perfluoroalkyl group having 3 to 7 carbon atoms.

Specific examples of the residue unit represented by the general formula (1) include the residue units shown hereinbelow.

[C16]

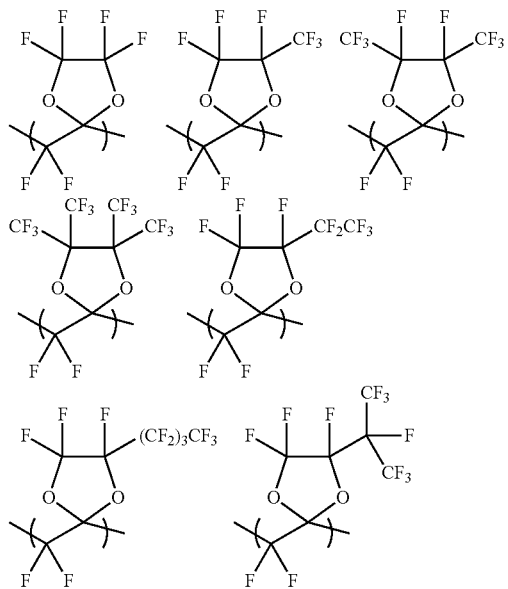

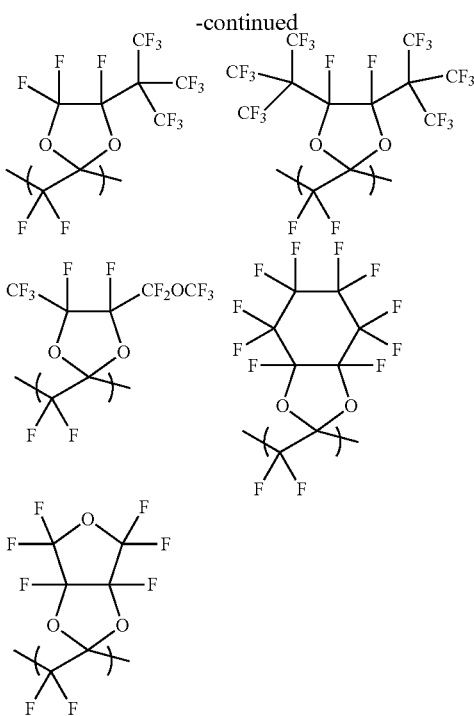

Among these, a fluororesin including a residue unit represented by the following formula (2) is preferable because of excellent heat resistance and molding processability thereof, and a fluororesin including perfluoro(4-methyl-2-methylene-1,3-dioxolane) residue unit is more preferable.

[C17]

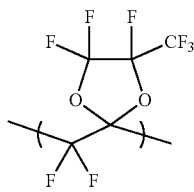

(2)

The fluororesin of the second aspect of the present invention has a weight average molecular weight Mw in the range of $5\times10^4$ to $3\times10^5$. When the weight average molecular weight Mw is in this range, the melt viscosity at a shear rate of 10-2 s and 250° C. can be $1\times10^2$ to $3\times10^5$ Pa·s, and as a result, the melt molding processability is excellent. Furthermore, excellent defoaming property at the time of melting is also achieved. Further, when the weight average molecular weight Mw is in this range, cracks are less likely to occur during heating and cooling. From the viewpoint of excellent melt molding processability and excellent defoaming property at the time of melting, the fluororesin of the present invention preferably has a weight average molecular weight Mw in the range of $5\times10^4$ to $2\times10^5$, because where the weight average molecular weight Mw is within this range, the melt viscosity at a shear rate of $10^{-2}$ s and 250° C. can be $1\times10^2$ to $2\times10^4$ Pa·s, and as a result, the melt molding processability is excellent and the defoaming property is also excellent. From the viewpoint of excellent melt molding processability and defoaming property at the time of melting, the weight average molecular weight Mw is more preferably in the range of $5\times10^4$ to $1.5\times10^5$, and from the viewpoint of obtaining less cracking during heating and cooling, the range is more preferably $6\times10^4$ to $1.5\times10^5$.

The weight average molecular weight Mw of the fluororesin according to the second aspect of the present invention can be calculated from the elution time of a sample and a standard sample and the molecular weight of the standard sample by using gel permission chromatography (GPC) and using, for example, standard polymethyl methacrylate having a known molecular weight as a standard sample, and using solvent capable of dissolving both the standard sample and the fluororesin as an eluent. The solution can be prepared by adding 1,1,1,3,3,3-hexafluoro-2-propanol (manufactured by Wako Pure Chemical Industries, Ltd.) to ASAHIKLIN AK-225 (manufactured by Asahi Glass Co., Ltd.) at 10% by weight with respect to AK-225.

The molecular weight distribution Mw/Mn, which is the ratio of the weight average molecular weight Mw to the number average molecular weight Mn, of the fluororesin according to the second aspect of the present invention is not particularly limited, but from the viewpoint of suppressing yellowing after heating and melting and achieving excellent melt molding processability, excellent defoaming property during melting, and less cracking during heating and cooling, the molecular weight distribution Mw/Mn is preferably 1.2 to 8, more preferably 1.2 to 5, even more preferably 1.5 to 3, and even more preferably 2.0 to 3. The number average molecular weight Mn can be measured by the same method as the above-mentioned method for measuring the weight average molecular weight Mw, and the molecular weight distribution Mw/Mn can be calculated by dividing the weight average molecular weight Mw by the number average molecular weight Mn.

The fluororesin of the second aspect of the present invention has a yellow index of a heat-melted molded product (thickness 3 mm) after 24 h at 280° C. of 6 or less. The yellow index of the heat-melted molded product (thickness 3 mm) after 24 h at 280° C. is preferably 5 or less, more preferably 4 or less, and even more preferably 3 or less. A yellow index of a heat-melted molded product (thickness 3 mm) after 24 h at 280° C. is as follows.

A total of 2.0 g of fluororesin was weighed into a Petri dish with an inner diameter of 26.4 mm (only a receiver in a set including a lid and a receiver in a flat Petri dish manufactured by Flat Co., Ltd., a glass thickness of 1 mm at the bottom), the Petri dish was placed in an inert oven (DN411I, manufactured by Yamato Scientific Co., Ltd.) and allowed to stand at room temperature for 30 min under an air stream (20 L/min), and the temperature was then raised to 280° C. over 30 min, followed by heating at 280° C. for 24 h. After that, the power of the inert oven was turned off while the oven door was closed and the air flow was maintained (20 L/min), and the sample was naturally cooled for 12 h and taken out. As a result, a fluororesin heat-melted molded product having a thickness of 3 mm and a diameter of 26.4 mm was obtained on the Petri dish. At this time, air compressed by a compressor and passed through a dehumidifier (dew point temperature −20° C. or lower) was used as the air. The transmittance was measured at each wavelength at 1 nm intervals at wavelengths of 200 nm to 1500 nm using a spectrophotometer (U-4100, manufactured by Hitachi High-Tech Science Co., Ltd.) for each obtained fluororesin heat-melted molded product together with the Petri dish. Data at 5 nm intervals at wavelengths of 380 nm to 780 nm were extracted from the measured transmittance data, and the tristimulus values X, Y, and Z of the XYZ color system were calculated according to the method of JIS Z8701, the yellow index (YI) under a C light source (auxiliary illuminant C) was calculated according to the method of JIS K7373, and the yellow index (YI) of the fluororesin heat-melted molded product including the Petri dish was obtained. The yellow index (YI) of the Petri dish (receiver only) alone was measured, and the yellow index (YI) of the Petri dish (receiver only) was subtracted from the yellow index (YI) of the fluororesin molded product including the Petri dish to obtain the yellow index (YI) of the fluororesin heat-melted molded product having a size of 3 mm. The yellow index (YI) of the Petri dish alone (receiver only) was 0.21.

Generally, lowering the molecular weight is effective for lowering the melt viscosity, but there is a problem that lowering the molecular weight lowers the glass transition temperature. The fluororesin according to the second aspect of the present invention preferably has a glass transition temperature of 125° C. or higher and 145° C. or lower even though the weight average molecular weight is in the above range. The fluororesin of the second aspect of the present invention preferably has a glass transition temperature of 125° C. or higher and 140° C. or lower, more preferably 128° C. or higher and 140° C. or lower, and further preferably 129° C. or higher and 135° C. or lower.

The glass transition temperature of the fluororesin of the second aspect of the present invention can be measured by determining the intermediate glass transition temperature using a differential scanning calorimeter (DSC). The measurement conditions can be exemplified by placing a sample in an aluminum sample pan, and raising the temperature the first time as −80° C.→200° C.→−80° C. (heating rate: 10° C./min) and the second time as −80° C.→200° C. (heating rate: 10° C./min) under a nitrogen stream (500 mL/min). The glass transition temperature can be calculated by determining the intermediate glass transition temperature according to the description of JIS-K 7121 from the chart obtained during second temperature rising. In this case, the DSC apparatus temperature-calibrated with indium and tin as standard substances can be used.

From the viewpoints of excellent melt molding processability and defoaming property during melting, less cracking during heating and cooling, and suppression of yellowing after heating and melting, it is preferable that the fluororesin of the second aspect of the present invention have a melt viscosity of $1 \times 10^2$ Pa·s to $3 \times 10^5$ Pa·s at a shear rate of $10^{-2}$ s and at 250° C. From the viewpoints of excellent melt molding processability and defoaming property during melting, less cracking during heating and cooling, and suppression of yellowing after heating and melting, the melt viscosity is more preferably in the range of $1 \times 10^2$ Pa·s to $5 \times 10^4$ Pa·s, even more preferably in the range of $1 \times 10^3$ Pa·s to $5 \times 10^4$ Pa·s, and further preferably in the range of $1 \times 10^3$ Pa·s to $2 \times 10^4$ Pa·s. As a method for measuring the melt viscosity, for example, measurement by a commercially available rotary rheometer can be exemplified, and the method described in JIS K 7244-10 can be exemplified.

From the viewpoint of good heat moldability, it is preferable that in the fluororesin of the second aspect of the present invention, the area occupied by bubbles in the heat-melted molded product (thickness 3 mm, diameter 26.4 mm) at 280° C. for 24 h be 10% or less of the area of the molded product. The area occupied by the bubbles in the heat-melted molded product (thickness 3 mm, diameter 26.4 mm) heated at 280° C. for 24 h is 5% or less, and more preferably 0%, with respect to the area of the molded product. Here, the ratio of the area occupied by the bubbles in the heat-melted molded product (thickness 3 mm, diameter 26.4 mm) heated at 280° C. for 24 h to the area of the molded product can be visually determined when it is visually clear. It can also be obtained by capturing an image of the molded product and analyzing it with image analysis software or the like.

From the viewpoint of good heat moldability, it is preferable that in the fluororesin of the second aspect of the present invention, the number of bubbles in the heat melt molded product (thickness 3 mm, diameter 26.4 mm) at 280° C. for 24 h be 10 or less. The number of bubbles in the melt-molded product (thickness 3 mm, diameter 26.4 mm) heated at 280° C. for 24 h is preferably 5 or less, and more preferably 0.

From the viewpoint of having excellent heat resistance, it is preferable that in the fluororesin according to the second aspect of the present invention, the difference B-A between an amount A of weight loss immediately after the temperature was raised to 300° C. at 10° C./min in air in TG-DTA and an amount B of weight loss after the temperature was raised to 300° C. and then held at 300° C. for 30 min be 1.0% or less. More preferably, the difference B-A is 0.5% or less, and even more preferably 0.3% or less. Here, the amount A (% by weight) of weight loss immediately after the temperature was raised to 300° C. is obtained by (sample weight immediately after the temperature was raised to 300° C.)/(weighed sample weight)×100, and the amount B (% by weight) of weight loss after the temperature was raised to 300° C. and then held at 300° C. for 30 min is obtained by (sample weight after the temperature was raised to 300° C. and then held at 300° C. for 30 min)/(weighed sample weight)×100.

The fluororesin of the second aspect of the present invention may include other monomer residue units, and examples of the other monomer residue units include tetrafluoroethylene (TFE), hexafluoropropylene (HFP), chlorotrifluoroethylene (CTFE), trifluoroethylene, hexafluoroisobutylene, a perfluoroalkylethylene, a fluorovinyl ether, vinyl fluoride (VF), vinylidene fluoride (VDF), perfluoro-2,2-dimethyl-1,3-dioxole (PDD), perfluoro(allyl vinyl ether), perfluoro(butenyl vinyl ether), and the like.

Next, a method for producing the fluororesin according to the second aspect of the present invention will be described.

The fluororesin according to the second aspect of the present invention can be produced by a method including a step of polymerizing a monomer represented by the following general formula (3) in the presence of a radical polymerization initiator and a chain transfer agent to obtain a fluororesin including a residual unit represented by the following general formula (4), the method using an organic compound having 1 to 20 carbon atoms including at least one atom selected from the group consisting of a hydrogen atom and a chlorine atom as the chain transfer agent. As a result, the obtained fluororesin has a weight average molecular weight Mw in the range of $5 \times 10^4$ to $3 \times 10^5$, and the yellow index of the heat-melted molded product (thickness 3 mm) at 280° C. for 24 h is 6 or less.

[C18]

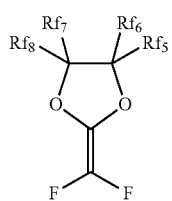

(3)

In the formula (3), $Rf_5$, $Rf_6$, $Rf_7$, and $Rf_8$ independently show at least one selected from the group consisting of a fluorine atom, a linear perfluoroalkyl group having 1 to 7 carbon atom, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_5$, $Rf_6$, $Rf_7$, and $Rf_8$ may be linked to one another to form a ring having 4 or more and 8 or less carbon atoms, and the ring may be a ring including an ethereal oxygen atom.

[C19]

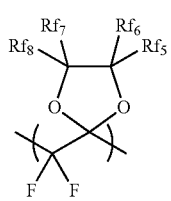

(4)

In the formula (4), $Rf_5$, $Rf_6$, $Rf_7$, and $Rf_e$ independently show at least one selected from the group consisting of a fluorine atom, a linear perfluoroalkyl group having 1 to 7 carbon atom, a branched perfluoroalkyl group having 3 to 7 carbon atoms, and a cyclic perfluoroalkyl group having 3 to 7 carbon atoms, the perfluoroalkyl group may have an ethereal oxygen atom, $Rf_5$, $Rf_6$, $Rf_7$, and $Rf_8$ may be linked to one another to form a ring having 4 or more and 8 or less carbon atoms, and the ring may be a ring including an ethereal oxygen atom.

$Rf_5$, $Rf_6$, $Rf_7$, and $Rf_e$ in the formulas (3) and (4) are the same as $Rf_1$, $Rf_2$, $Rf_3$, and $Rf_4$ in the formulas (1) and (2) in the second aspect of the present invention, respectively.

In the method for producing a fluororesin according to the second aspect of the present invention, by using an organic compound having at least one atom selected from the group consisting of a hydrogen atom and a chlorine atom and having 1 to 20 carbon atoms as the chain transfer agent, it is possible to control the molecular weight of the fluororesin within the above range while suppressing yellowing after heating and melting. Here, the chain transfer agent represents a substance having an effect of lowering the molecular weight by being present in the system during radical polymerization of the fluororesin. Specific examples of the chain transfer agent include organic compounds having 1 to 20 carbon atoms and including a hydrogen atom, such as toluene, acetone, ethyl acetate, tetrahydrofuran, methyl ethyl ketone, methanol, ethanol, and isopropanol; and organic compounds having 1 to 20 carbon atoms and including a chlorine atom, such as chloroform, dichloromethane, tetrachloromethane, chloromethane, dichloroethane, trichloroethane, tetrachloroethane, pentachloroethane, hexachloroethane, benzyl chloride, pentafluorobenzyl chloride, and pentafluorobenzoyl chloride. Among them, from the viewpoint of enabling control of the molecular weight of the fluororesin, achieving excellent molding processability, excellent defoaming property during melting, less cracking during heating and cooling, and also high yield while suppressing yellowing after heating and melting, an organic compound having 1 to 20 carbon atoms and including a chlorine atom is preferable, and a more preferable compound is represented by the general formula (A).

[C20]

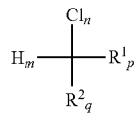

(A)

In the formula (A), m is an integer of 0 to 3, n is an integer of 1 to 3, p is an integer of 0 to 1, q is an integer of 0 to 1, and m+n+p+q is 4. $R^1$ and $R^2$ are each independently a hydrocarbon group having 1 to 19 carbon atoms or an oxygen atom, and the oxygen atom may form a double bond with an adjacent carbon atom. The total number of carbon atoms of $R^1$ and $R^2$ is 1 to 19, and the hydrocarbon group may have one or more atoms selected from an oxygen atom, a fluorine atom, and a chlorine atom, and may have no hydrogen atom. Further, the hydrocarbon group may be linear, branched, alicyclic or aromatic, and $R^1$ and $R^2$ may be linked to each other to form a ring having 3 to 19 carbon atoms.

Among them, from the viewpoint of enabling control of the molecular weight of the fluororesin, achieving excellent molding processability, excellent defoaming property during melting, less cracking during heating and cooling, and also high yield while suppressing yellowing after heating and melting, an organic compound having 1 to 20 carbon atoms and including a hydrogen atom a chlorine atom is preferable. Examples of the organic compound having 1 to 20 carbon atoms and including a hydrogen atom a chlorine atom include chloroform, dichloromethane, chloromethane, dichloroethane, trichloroethane, tetrachloroethane, pentachloroethane, benzyl chloride, pentafluorobenzyl chloride, and the like. Further, from the viewpoint of enabling control of the molecular weight of the fluororesin, achieving excellent molding processability, excellent defoaming property during melting, less cracking during heating and cooling, and also high yield while suppressing yellowing after heating and melting, in the organic compound having 1 to 20 carbon atoms and including a hydrogen atom a chlorine atom, the number ratio of hydrogen atoms to chlorine atoms is preferably in the range of hydrogen atoms:chlorine atoms=1:9 to 9:1, and more preferably in the range of 1:9 to 5:5. In addition, from the viewpoint of enabling control of the molecular weight of the fluororesin, achieving excellent molding processability, excellent defoaming property during melting, less cracking during heating and cooling, and also high yield while suppressing yellowing after heating and melting, the organic compound having 1 to 20 carbon atoms and including a hydrogen atom a chlorine atom is preferably represented by the following general formula (B) or (C), and more preferably by the general formula (B).

[C21]

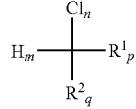

(B)

In the formula (B), m and n are independently integers of 1 to 3, p is an integer of 0 to 1, q is an integer of 0 to 1, and m+n+p+q is 4. $R^1$ and $R^2$ are each independently a hydrocarbon group having 1 to 19 carbon atoms, and the total number of carbon atoms of $R^1_p$ and $R^2_q$ is 0 to 19, and the hydrocarbon group may have one or more atoms selected from an oxygen atom, a fluorine atom, and a chlorine atom, and may have no hydrogen atom. Further, the hydrocarbon group may be linear, branched, alicyclic or aromatic, and $R^1$ and $R^2$ may be linked to each other to form a ring having 3 to 19 carbon atoms.

[C22]

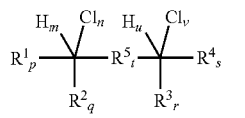

(C)

In the formula (C), m, n, u, and v are each independently an integer of 0 to 3, m+u is 1 to 5, n+v is 1 to 5, and p, q, r, s, and t are each independently an integer of 0 to 1, m+n+p+q is 3, r+s+u+v is 3, $R^1$, $R^2$, $R^3$, $R^4$, and $R^5$ are each independently a hydrocarbon group having 1 to 18 carbon atoms, the total number of carbon atoms of $R^1$, $R^2$, $R^3$, $R^4$, and $R^5$ is 0 to 18, and the hydrocarbon group may have one or more atoms selected from oxygen atom, fluorine atom, and chlorine atom, and may have no hydrogen atom. Further, the hydrocarbon group may be linear, branched, alicyclic or aromatic, and two or more groups selected from $R^1$, $R^2$, $R^3$, $R^4$, and $R^5$ may be linked to each other to form a ring having 3 to 19 carbon atoms, and there may be a plurality of such rings.

Examples of the organic compound having 1 to 20 carbon atoms and including a chlorine atom that is represented by the general formula (A) include chloroform, dichloromethane, tetrachloromethane, chloromethane, dichloroethane, trichlorethylene, tetrachloroethane, pentachloroethane, hexachloroethane, benzyl chloride, pentafluorobenzyl chloride, pentafluorobenzoyl chloride, and the like. Examples of the organic compound having 1 to 20 carbon atoms and including a hydrogen atom and a chlorine atom that is represented by the general formula (B) include chloroform, dichloromethane, chloromethane, dichloroethane, trichloroethane, tetrachloroethane, pentachloroethane, benzyl chloride, pentafluorobenzyl chloride, and the like. Examples of the organic compound having 1 to 20 carbon atoms and including a hydrogen atom and a chlorine atom that is represented by the general formula (C) include 1,1,1-tichloroethane and the like.

Further, a fluororesin having both defoaming property at the time of melting and crack resistance, and also excellent defoaming property at the time of melting and heat resistance, low melt viscosity, and less crack generation can be obtained, and the yield is also excellent. Therefore, the amount of the chain transfer agent is preferably 3% by weight to 50% by weight, more preferably 3% by weight to 30% by weight, and even more preferably 4% by weight to 20% by weight, based on the total amount of the monomer and the chain transfer agent.

From the viewpoint of obtaining excellent melt molding processability, excellent defoaming property during melting, less cracking during heating and cooling, and also excellent yield while suppressing yellow during heating and melting, in the method for producing a fluororesin according to the second aspect of the present invention, it is preferable to use an organic solvent for (hereinafter, referred to as "precipitation polymerization solvent") that dissolves a monomer represented by the general formula (4) and causes precipitation of the fluororesin including a residue unit represented by the general formula (5) as a polymerization solvent.

In the method for producing a fluororesin according to the second aspect of the present invention, it is preferable to select an organic solvent having a certain specific polarity range as the precipitation polymerization solvent on the basis of Hansen solubility parameters.

Hansen divided a solubility parameter introduced by Hildebrand into three components, namely, a dispersion term δD, a polarity term δP, and a hydrogen bond term δH, and these Hansen solubility parameters are shown in a three-dimensional space. The dispersion term δD shows the effect due to the dispersion forces, the polarity term δP shows the effect due to the dipole force, and the hydrogen bond term δH shows the effect due to the hydrogen bond force. The farther the coordinates of a certain resin and the coordinates of a certain organic solvent are in the three-dimensional space, the more unlikely it is that the resin will dissolve in the organic solvent.

The definition and calculation method of the Hansen solubility parameters are described in the following document. Charles M. Hansen, "Hansen Solubility Parameters: A Users Handbook", CRC Press, 2007. For organic solvents for which literature values are unknown, the Hansen solubility parameter can be easily estimated from the chemical structure by using computer software (Hansen Solubility Parameters in Practice (HSPiP)).

In the present invention, HSPiP 5th Edition is used, for the organic solvents registered in the database, the values thereof are used, and for the organic solvents that are not registered, the estimated value is used.

The Hansen solubility parameters of a resin can be determined by checking whether the resin precipitates when a solution of the resin in a good solvent is added to a number of different organic solvents for which the Hansen solubility parameters have been established. Specifically, when the coordinates of the Hansen solubility parameters of all the organic solvents used in the test are shown in the three-dimensional space, a sphere (solubility sphere) is found such that all the coordinates of the organic solvents in which the resin A does not precipitate are contained inside a sphere, and the coordinates of the organic solvents that cause the precipitation of the resin A are outside the sphere, and the center coordinate of the solubility sphere is taken as the Hansen solubility parameter of the resin.

In the case where the coordinates of the Hansen solubility parameters of a certain organic solvent that was not used in the solubility test are (δD, δP, δH), where the coordinates are contained inside the solubility sphere, it is considered that the organic solvent dissolves a resin without causing precipitation. Meanwhile, where the coordinates are outside the solubility sphere, the organic solvent is considered to cause the precipitation of the resin.

In the present invention, Hansen solubility parameters of a compound represented by a following general formula (7) hereinbelow (the pentamer of the compound represented by the general formula (4)) that were estimated using HSPiP were used as the Hansen solubility parameter of the resin particles. By this method, for example, the Hansen solubility parameters (δD, δP, δH of the resin particles including the perfluoro(4-methyl-2-methylene-1,3-dioxolane) residue unit represented by the general formula (2) are 11.6, 3.5, and 1.4 $(MPa^{1/2})$, respectively.

[C23]

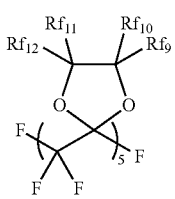

(7)

In the formula (7), $Rf_9$, $Rf_{10}$, $Rf_{11}$, and $Rf_{12}$ are each independently at least one from the group consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms. The perfluoroalkyl group may have an ethereal oxygen atom. Further, $Rf_9$, $Rf_{10}$, $Rf_{11}$, and $Rf_{12}$ may be linked to one another to form a ring having 4 or more and 8 or less carbon atoms, and the ring may be a ring including an ethereal oxygen atom.

As the precipitation polymerization solvent in the second aspect of the present invention, it is preferable to select an organic solvent having a dissolution index R with the resin of 4 or more, which is calculated by a formula (8) from the Hansen solubility parameters.

$$R = 4 \times \{(\delta D_1 - \delta D_2)^2 + (\delta P_1 - \delta P_2)^2 + (\delta H_1 - \delta H_2)^2\}^{0.5} \quad (8)$$

Here, $\delta D_1$, $\delta P_1$, and $\delta H_1$ are the dispersion term, polarity term and hydrogen term of the Hansen solubility parameters of the resin particles, respectively, and $\delta D_2$, $\delta P_2$, and $\delta H_2$ are the dispersion term, polarity term and hydrogen term of the Hansen solubility parameters of the organic solvent, respectively.

For example, the following organic solvent can be mentioned as an organic solvent having an affinity Ra of 4 or more with a resin including a perfluoro(4-methyl-2-methylene-1,3-dioxolane) residue unit.

TABLE 2-1

| Solvent type | δD | δP | δH | R | Literature value |
|---|---|---|---|---|---|
| Acetone | 15.5 | 10.4 | 7.0 | 11.8 | Database value |
| Methyl ethyl ketone | 16.0 | 9.0 | 5.1 | 11.0 | Database value |
| Hexane | 14.9 | 0.0 | 0.0 | 7.6 | Database value |
| Chloroform | 17.8 | 3.1 | 5.7 | 13.1 | Database value |
| Butyl acetate | 15.8 | 3.7 | 6.3 | 9.7 | Database value |
| Toluene | 18.0 | 1.4 | 2.0 | 13.0 | Database value |
| 2,2,2-Trifluoroethanol | 15.4 | 8.3 | 16.4 | 17.5 | Database value |
| 1,2,2,3,3,3-Hexafluoro-2-propanol | 17.2 | 4.5 | 14.7 | 17.4 | Database value |
| 1,2,2,3,3,4,4-Heptafluorocyclopentane | 14.5 | 2.7 | 2.1 | 5.9 | Calculated value |
| 1,1,2,2-Tetrafluoroethyl-2,2,2-trifluoroethyl ether | 14.1 | 5.0 | 4.0 | 5.8 | Calculated value |

Further, from the viewpoint of suppressing yellowing after heating and melting and achieving excellent molding processability, excellent defoaming property during melting, less cracking during heating and cooling, and also high yield, an organic solvent including a fluorine atom and a hydrogen atom in the molecule is preferable as the precipitation polymerization solvent. Specific examples of the precipitation polymerization solvent including a fluorine atom and a hydrogen atom in the molecule include 1,1,2,2-tetrafluoroethyl-2,2,2-trifluoroethyl ether, 2,2,2-trifluoroethanol, 1,1,1,3,3,3-hexafluoroisopropanol, 1,2,2,3,3,4,4-heptafluorocyclopentane, 1H,1H-pentafluoropropanol, 1H,1H-heptafluorobutanol, 2-perfluorobutylethanol, 4,4,4-trifluorobutanol, 1H,1H,3H-tetrafluoropropanol, 1H,1H,5H-octafluoropropanol, 1H,1H,7H-dodecafluoroheptanol, 1H,1H,3H-hexafluorobutanol, 2,2,3,3,3-pentafluoropropyldifluoromethyl ether, 2,2,3,3,3-pentafluoropropyl-1,1,2,2-tetrafluoroethyl ether, 1,1,2,2-tetrafluoroethyl ethyl ether, 1,1,2,2-tetrafluoroethyl-2,2,3,3-tetrafluoropropyl ether, hexafluoroisopropylmethyl ether, 1,1,3,3,3-pentafluoro-2-trfluoromethylpropylmethyl ether, 1,1,2,3,3,3-hexafluoropropylmethyl ether, 1,1,2,3,3,3-hexafluoropropyl ethyl ether, 2,2,3,4,5,4-hexafluorobutyldifluoromethyl ether, and the like.

Among them, 1,1,2,2-tetrafluoroethyl-2,2,2-trifluoroethyl ether, 2,2,2-trifluoroethanol, 1,1,1,3,3,3-hexafluoroisopropanol and 1,2,2,3,3,4,4-heptafluorocyclopentane are preferable, and from the viewpoint of suppressing yellowing after heating and melting and achieving excellent molding processability, excellent defoaming property during melting, less cracking during heating and cooling, and also high yield, 1,2,2,3,3,4,4-heptafluorocyclopentane is preferable. As for the ratio of fluorine atoms to hydrogen atoms in the molecule of the precipitation polymerization solvent, from the viewpoint of suppressing yellowing after heating and melting and achieving excellent molding processability, excellent defoaming property during melting, less cracking during heating and cooling, and also high yield, the number ratio of atoms is preferably fluorine atoms:hydrogen atoms=1:9 to 9:1.

Whether the organic solvent causes the precipitation of a resin including a residue unit represented by the general formula (4) can be determined by dropwise adding a solution obtained by dissolving the resin in a good solvent to the organic solvent, and the organic solvent is determined to cause the precipitation of the resin in the case where the resin precipitates. The good solvent is a solvent that dissolves the resin, and examples thereof include perfluorocarbons such as perfluorohexane and hexafluorobenzene.

Examples of the radical polymerization initiator for performing radical polymerization include perfluoroorganic peroxides such as bis(perfluorobenzoyl) peroxide (PFBPO), $(CF_3COO)_2$, $(CF_3CF_2COO)_2$, $(C_3F_7COO)_2$, $(C_4F_9COO)_2$, $(C_5F_{11}COO)_2$, $(C_6F_{13}COO)_2$, $(C_7F_{15}COO)_2$, and $(C_8F_{17}COO)_2$; organic peroxides such as benzoyl peroxide, lauryl peroxide, octanoyl peroxide, acetyl peroxide, di-tert-butyl peroxide, tert-butyl cumyl peroxide, dicumyl peroxide, tert-butyl peroxyacetate, perfluoro(di-tert-butyl peroxide), bis(2,3,4,5,6-pentafluorobenzoyl) peroxide, tert-butylperoxybenzoate, and tert-butylperpivalate; and azo-based initiators such as 2,2'-azobis(2,4-dimethylvaleronitrile), 2,2'-azobis(2-butyronitrile), 2,2'-azobisisobutyronitrile, dimethyl-2,2'-azobisisobutyrate, and 1,1'-azobis(cyclohexane-1-carbonitrile). Among them, from the viewpoint of suppressing yellowing after heating and melting and achieving excellent molding processability, excellent defoaming property during melting, and less cracking during heating and cooling, perfluoroorganic peroxides are preferable, and bis (perfluorobenzoyl)peroxide (PFBPO) is even more preferable. Here, the perfluoroorganic peroxide refers to a compound having a structure in which a hydrogen atom of the organic peroxide is replaced with a fluorine atom.

In the production method of the present invention, the monomer represented by the general formula (3) is preferably perfluoro(4-methyl-2-methylene-1,3-dioxolane) represented by the general formula (5), and the residue unit represented by the formula (4) is preferably a perfluoro(4-methyl-2-methylene-1,3-dioxolane) residue unit represented by the general formula (6).

[C24]

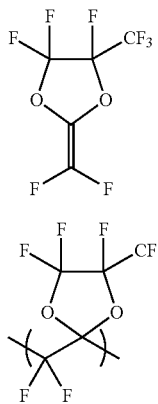

In the fluororesin obtained by production by the method of the present invention, yellowing after heating and melting is suppressed, excellent molding processability, excellent defoaming property during melting, and less cracking during heating are achieved, a change in the amount of weight loss when held at 300° C. for a certain period of time is small, and thermal decomposition is unlikely to occur.

EXAMPLES

Hereinafter, the present invention will be described in more detail with reference to Examples, but the present invention is not limited to these Examples.

Example of First Aspect of Present Invention

<Volume Average Particle Diameter>
The volume average particle diameter (unit: μm) was measured using MT3000 manufactured by Microtrac Co., Ltd. and methanol as a dispersion medium.
<10% Particle Diameter>
The 10% particle diameter (unit: μm) was measured using MT3000 manufactured by Microtrac Co., Ltd. and methanol as a dispersion medium.
<90% Particle Diameter>
The 90% particle diameter (unit: μm) was measured using MT3000 manufactured by Microtrac Co., Ltd. and methanol as a dispersion medium.
<Flowability>
The case where the shape of the resin was particulate was regarded as good (A), and the case where it was not particulate was regarded as defective (B).
<Bulk Density>
Resin particles were dropped and filled up to the 50 mL mark on the graduated cylinder without impacting the graduated cylinder. The weight (g) of the resin particles per 50 mL of the volume was measured. The bulk density (g/mL) was calculated by dividing the weight of the resin particles by the volume.

<Filling Property>
A bulk density of 0.2 g/mL or more was regarded as good (A), and a bulk density of less than 0.2 g/mL was regarded as poor (B).
<Weight Average Molecular Weight Mw>
Measurements were performed using a column TSKgel SuperHZM-M manufactured by Tosoh Corporation and gel permission chromatograph equipped with an RI detector. An eluent was prepared by adding 1,1,1,3,3,3-hexafluoro-2-propanol (manufactured by Wako Pure Chemical Industries, Ltd.) to ASAHIKLIN AK-225 (manufactured by Asahi Glass Co., Ltd.) in an amount of 10% by weight based on AK-225. Standard polymethyl methacrylate manufactured by Agilent Technologies, Inc. was used as a standard sample, and the weight average molecular weight Mw in terms of polymethyl methacrylate was calculated from the elution times of the sample and the standard sample.
<Amount of Weight Loss in Heating at 250° C.>
About 10 mg to 15 mg of a sample was weighed in an aluminum sample pan (SSC000E030, manufactured by Hitachi High-Tech Science Co., Ltd.), the temperature was raised from 40° C. to 300° C. at 10° C./min under an instrumented air flow (160 mL/min) in a TG/DTA device (TG/DTA6200AST2, manufactured by Hitachi High-Tech Science Co., Ltd.), and an amount of weight loss at 250° C. (1−(sample weight at 250° C.)/(weighed sample weight))×100) was obtained and taken as the amount of weight loss in heating at 250° C.
<Angle of Repose>
A sample bottle was filled with 7 ml of resin powder, a glass powder funnel (manufactured by AS ONE Corporation, the diameter of the upper part of the funnel is 50 mm, the diameter of the lower part of the funnel is 10 mm, the total length of the funnel is 100 mm, the height of the funnel foot portion is 40 mm) was fixed on a circular table (made of glass) with a diameter of 4 cm, so that the lower end of the powder funnel was 4 cm above the circular table, the funnel was used to drop the resin powder from the height of the upper end of the funnel, and the angle (°) of the slope of the heap formed by the deposited powder was measured with a protractor (in the comparative example, the flowability of the resin powder was poor, so the resin powder was dropped without using the powder funnel).

(Example 1-1) Production of perfluoro(4-methyl-2-methylene-1,3-dioxolane) Resin Particles The inside of a 1 L SUS316 autoclave equipped with an anchor type stirring blade, a nitrogen introduction tube and a thermometer was replaced with nitrogen. A total of 1.288 g (0.00305 mol) of bis(2,3,4,5,6-pentafluorobenzoyl) peroxide as an initiator, 150.0 g (0.615 mol) of perfluoro(4-methyl-2-methylene-1,3-dioxolane as a monomer, and 1340 g of ASAHIKLIN AE-3000 (manufactured by Asahi Glass Co., Inc., 1,1,2,2-tetrafluoroethyl-2,2,2-trifluoroethyl ether, amount of hydrogen atoms in the solvent molecule: 1.51% by weight, and fluorine atom:hydrogen atom=7:3 (number ratio) in the solvent molecule) as a precipitation polymerization solvent were added, and precipitation polymerization was carried out by holding at 55° C. for 24 h under stirring. Perfluoro(4-methyl-2-methylene-1,3-dioxolane) resin particles (resin A) (yield: 56%) were obtained by cooling to room temperature, filtering off the liquid including purified resin particles, washing with acetone, and vacuum drying. Table 1-1 shows the shape, volume average particle diameter, 10% particle diameter, 90% particle diameter, bulk density, and angle of repose of the obtained resin particles. The obtained resin particles were excellent in flowability and filling property. The weight average molecular weight Mw of the obtained resin A was $4.4 \times 10^5$.

TABLE 1-1

| | Units | Example 1-1 | Example 1-2 | Example 1-3 | Comparative Example 1-1 |
|---|---|---|---|---|---|
| Resin | — | A | B | C | D |
| Shape | — | Particles | Particles | Particles | Indeterminate shape |
| Volume average particle diameter | μm | 49 | 176 | 117 | Measurement is impossible |
| 10% Particle diameter | μm | 21 | 73 | 43 | Measurement is impossible |
| 90% Particle diameter | μm | 70 | 308 | 198 | Measurement is impossible |
| Bulk density | g/mL | 0.32 | 0.23 | 0.78 | 0.06 |
| Angle of repose | ° | 20 | 30 | 30 | 80 |
| Flowability | — | A | A | A | B |
| Filling property | — | A | A | A | B |
| Weight loss amount during heating at 250° C. | % by weight | 0.05 | 0.19 | 0.28 | 1.36 |

TABLE 3

Table 1-2

| | Units | Example 1-4 | Example 1-5 |
|---|---|---|---|
| Resin | — | E | F |
| Shape | — | Particles | Particles |
| Volume average particle diameter | μm | 57 | 109 |
| 10% Particle diameter | μm | 21 | 47 |
| 90% Particle diameter | μm | 82 | 174 |
| Bulk density | g/mL | 0.39 | 0.26 |
| Angle of repose | ° | 20 | 20 |
| Flowability | — | A | A |
| Filling property | — | A | A |
| Weight loss amount during heating at 250° C. | % by weight | 0.04 | 0.06 |

(Comparative Example 1-1) Production of perfluoro(4-methyl-2-methylene-1,3-dioxolane) resin A total of 0.017 g (0.0000407 mol) of bis(2,3,4,5,6-pentafluorobenzoyl) peroxide as an initiator, 5.0 g (0.0205 mol) of perfluoro(4-methyl-2-methylene-1,3-dioxolane) as a monomer, and 8.2 g of hexafluorobenzene (amount of hydrogen atoms in the solvent molecule: 0% by weight, and fluorine atom:hydrogen atom=10:0 (number ratio) in the solvent molecule) as a polymerization solvent were placed in a glass ampoule having a capacity of 75 mL and were sealed under reduced pressure after repeating nitrogen substitution and depressurization. When this ampoule was placed in a thermostat at 55° C. and held for 24 h to carry out radical solution polymerization, a viscous liquid in which the resin was dissolved was obtained. After cooling to room temperature, the ampoule was opened, and the resin solution was diluted with 36 g of hexafluorobenzene for viscosity adjustment to prepare a resin diluted solution. A total of 1 L of chloroform was added to a beaker equipped with an anchor blade, the resin was precipitated by adding the resin diluted solution to the chloroform under stirring, and the precipitate was vacuum-dried to obtain perfluoro(4-methyl-2-methylene-1,3-dioxolane) resin (resin D) (yield: 61%). The weight average molecular weight Mw of the obtained resin D was $3.5 \times 10^5$. The shape, bulk density, and angle of repose of the obtained resin are shown in Table 1-1. Since the resin had indeterminate shape, the volume average particle diameter could not be measured. In this case, the obtained resin had problems in flowability and filling property.

(Example 1-2) Production of perfluoro(4-methyl-2-methylene-1,3-dioxolane) Resin Particles The inside of a 1 L SUS316 autoclave equipped with an anchor type stirring blade, a nitrogen introduction tube and a thermometer was replaced with nitrogen. A total of 0.346 g (0.000820 mol) of bis(2,3,4,5,6-pentafluorobenzoyl) peroxide as an initiator, 100.0 g (0.410 mol) of perfluoro(4-methyl-2-methylene-1,3-dioxolane) as a monomer, and 890 g of 2,2,2-trifluoroethanol (amount of hydrogen atoms in the solvent molecule: 3.03% by weight, and fluorine atom: hydrogen atom=5:5 (number ratio) in the solvent molecule) as a precipitation polymerization solvent were added, and precipitation polymerization was carried out by holding at 55° C. for 24 h under stirring. Perfluoro(4-methyl-2-methylene-1,3-dioxolane) resin particles (resin B) (yield: 78%) were obtained by cooling to room temperature, filtering off the liquid including purified resin particles, washing with acetone, and vacuum drying. Table 1-1 shows the shape, volume average particle diameter, 10% particle diameter, 90% particle diameter, bulk density, and angle of repose of the obtained resin particles. The obtained resin particles were excellent in flowability and filling property. The weight average molecular weight Mw of the obtained resin B was $1.1 \times 10^5$.

(Example 1-3) Production of perfluoro(4-methyl-2-methylene-1,3-dioxolane) Resin Particles The inside of a 1 L SUS316 autoclave equipped with an anchor type stirring blade, a nitrogen introduction tube and a thermometer was replaced with nitrogen. A total of 0.519 g (0.00123 mol) of bis(2,3,4,5,6-pentafluorobenzoyl) peroxide as an initiator, 150.0 g (0.615 mol) of perfluoro(4-methyl-2-methylene-1,3-dioxolane) as a monomer, and 1150 g of chloroform as a precipitation polymerization solvent were added, and precipitation polymerization was carried out by holding at 55° C. for 24 h under stirring. Perfluoro(4-methyl-2-methylene-1,3-dioxolane) resin particles (resin C) (yield: 19%) were obtained by cooling to room temperature, filtering off the liquid including purified resin particles, washing with acetone, and vacuum drying. Table 1-1 shows the shape, volume average particle diameter, 10% particle diameter, 90% particle diameter, bulk density, and angle of repose of the obtained resin particles. The obtained resin particles were excellent in flowability and filling property. The weight average molecular weight Mw of the obtained resin C was $7.0 \times 10^3$.

(Example 1-4) Production of perfluoro(4-methyl-2-methylene-1,3-dioxolane) Resin Particles The inside of a 1 L SUS316 autoclave equipped with an anchor type stirring blade, a nitrogen introduction tube and a thermometer was replaced with nitrogen. A total of 1.038 g (0.00246 mol) of bis(2,3,4,5,6-pentafluorobenzoyl) peroxide as an initiator, 300.0 g (1.23 mol) of perfluoro(4-methyl-2-methylene-1,3-dioxolane) as a monomer, and 1200 g of ZEORORA-H (manufactured by Nippon Zeon Co., Ltd, 1,2,2,3,3,4,4-heptafluorocyclopentane, amount of hydrogen atoms in the solvent molecule: 1.55% by weight, and fluorine atom:hydrogen atom=7:3 (number ratio) in the solvent molecule) as a precipitation polymerization solvent were added, and precipitation polymerization was carried out by holding at 55° C. for 24 h under stirring. Perfluoro (4-methyl-2-methylene-1,3-dioxolane) resin particles (resin E) (yield: 86%) were obtained by cooling to room temperature, filtering off the liquid including purified resin particles, washing with acetone, and vacuum drying. Table 1-2 shows the shape, volume average particle diameter, 10% particle diameter, 90% particle diameter, bulk density, and angle of repose of the obtained resin particles. The obtained resin particles were excellent in flowability and filling property. The weight average molecular weight Mw of the obtained resin E was $4.9 \times 10^5$.

(Example 1-5) Production of perfluoro(4-methyl-2-methylene-1,3-dioxolane) Resin Particles The inside of a 1 L SUS316 autoclave equipped with an anchor type stirring blade, a nitrogen introduction tube and a thermometer was replaced with nitrogen. A total of 0.519 g (0.00123 mol) of bis(2,3,4,5,6-pentafluorobenzoyl) peroxide as an initiator, 150.0 g (0.615 mol) of perfluoro(4-methyl-2-methylene-1,3-dioxolane) as a monomer, and 1340 g 1,1,1,3,3,3-hexafluoroisopropanol (amount of hydrogen atoms in the solvent molecule: 1.82% by weight, and fluorine atom:hydrogen atom=6:4 (number ratio) in the solvent molecule) as a precipitation polymerization solvent were added, and precipitation polymerization was carried out by holding at 55° C. for 24 h under stirring. Perfluoro (4-methyl-2-methylene-1,3-dioxolane) resin particles (resin F) (yield: 59%) were obtained by cooling to room temperature, filtering off the liquid including purified resin particles, washing with acetone, and vacuum drying. Table 1-2 shows the shape, volume average particle diameter, 10% particle diameter, 90% particle diameter, bulk density, and angle of repose of the obtained resin particles. The obtained resin particles were excellent in flowability and filling property. The weight average molecular weight Mw of the obtained resin F was $7.9 \times 10^5$.

Reference Example 1-1

The resin particles obtained in Example 1-1 were immersed in a tenfold amount of various solvents at 50° C. for 5 h, and it was visually observed whether the resin particles remained.

The organic solvents in which the residual resin particles were visually confirmed are as follows:

1,1,2,2-tetrafluoroethyl-2,2,2-trifluoroethyl ether,
2,2,2-trifluoroethanol,
1,1,1,3,3,3-hexafluoroisopropanol,
1,2,2,3,3,4,4-heptafluorocydopentane, and
chloroform Then, after cooling to 25° C. and filtering through a filter, the resin particles were taken out by rinsing with the solvent, and then the resin particles were washed twice with a tenfold amount of acetone and vacuum dried, and a recovery rate was determined from the dry weight. The recovery rate was 90% or more in each case. Further, when the filtrate obtained was distilled off and the solid content in the filtrate was determined, the solid content in the filtrate was less than 10% with respect to the resin particles used. From the above results, it was confirmed that the weight loss ratio of the resin weight was less than 10% by weight.

Reference Example 1-2

The resin particles obtained in Example 1-1 were immersed at 50° C. for 5 h in a tenfold amount of various solvents described hereinbelow, and it was visually observed whether the resin particles remained.

The organic solvents in which the residual resin particles were not seen with the naked eye are as follows:

hexafluorobenzene, $CF_3CF_2CHCl_2$ (amount of hydrogen atom in the solvent molecule: 0.55% by weight, fluorine atom:hydrogen atom in the solvent molecule=8:2 (number ratio))

As a result of visual observation at 50° C., all the solutions were transparent and almost no turbidity was confirmed. After cooling to 25° C. and filtration through a filter, rinsing the filter with the solvent was performed, the filter was vacuum dried, and the recovery rate was calculated from the weight increase of the filter. As a result, the weight increase was less than 5% by weight in all cases. From the above results, it was confirmed that the weight loss ratio of the resin after immersion in the solvent was 95% by weight or more.

Example of Second Aspect of Present Invention

<Methods for Measuring Physical Properties>
(1) Weight Average Molecular Weight Mw, Molecular Weight Distribution Mw/Mn Measurements were performed using a column TSKgel SuperHZM-M manufactured by Tosoh Corporation and gel permission chromatograph equipped with an RI detector. An eluent was prepared by adding 1,1,1,3,3,3-hexafluoro-2-propanol (manufactured by Wako Pure Chemical Industries, Ltd.) to ASAHIKLIN AK-225 (manufactured by Asahi Glass Co., Ltd.) in an amount of 10% by weight based on AK-225. Standard polymethyl methacrylate manufactured by Agilent Technologies, Inc. was used as a standard sample, and the weight average molecular weight Mw and the number average molecular weight Mn in terms of polymethyl methacrylate were calculated from the elution times of the sample and the standard sample. The molecular weight distribution Mw/Mn was calculated by dividing the weight average molecular weight Mw by the number average molecular weight Mn.

(2) Glass Transition Temperature

About 10 mg of a sample was weighed in an aluminum sample pan (52-023P, manufactured by Hitachi High-Tech Science Corporation), and the sample was covered with an aluminum lid (52-023C, manufactured by Hitachi High-Tech Science Corporation), and sealed with an electric sample sealer (DICE) (manufactured by Hitachi High-Tech Science Corporation) (Hitachi High-Tech Science Corporation). The temperature was raised with a DSC device (DSC6220, manufactured by Hitachi High-Tech Science Corporation) by the following program: the first time: $-80°$ C.$\rightarrow 200°$ C.$\rightarrow -80°$ C. (heating rate: $10°$ C./min), the second time: $-80°$ C.$\rightarrow 200°$ C. (heating rate: $10°$ C./min), under a nitrogen stream (500 mL/min). The glass transition temperature was calculated by determining the intermediate glass transition temperature according to the description of JIS-K7121 from the chart at the time of heating. Further, the DSC apparatus used was temperature-calibrated with indium and tin as standard substances.

(3) Melt Viscosity

The complex viscosity at a frequency of $10^{-2}$ (rad·s$^{-1}$) was measured at $250°$ C. by using a rotary rheometer MCR-300 manufactured by Anton-Paar GmbH, and the value of the complex viscosity was expressed as the melt viscosity.

(4) Weight Loss

Approximately 10 mg to 15 mg of a sample was weighed in an aluminum sample pan (SSC000E030, manufactured by Hitachi High-Tech Science Corporation), the temperature was raised from $40°$ C. to $300°$ C. at $10°$ C./min under an air flow (160 mL/min) using a TG/DTA device (TG/DTA6200AST2 manufactured by Hitachi High-Tech Science Corporation), and a difference B-A between an amount A of weight loss immediately after the temperature was raised to $300°$ C. at $10°$ C./min in air and an amount B of weight loss after the temperature was raised to $300°$ C. and then held at $300°$ C. for 30 min in TG-DTA was determined. Here, the amount A (% by weight) of weight loss immediately after the temperature was raised to $300°$ C. is obtained by (sample weight immediately after the temperature was raised to $300°$ C.)/(weighed sample weight)×100, and the amount B (% by weight) of weight loss after the temperature was raised to $300°$ C. and then held at $300°$ C. for 30 min is obtained by (sample weight after the temperature was raised to $300°$ C. and then held at $300°$ C. for 30 min)/(weighed sample weight)×100. At this time, air compressed by a compressor was passed through a dehumidifier (dew point temperature $-20°$ C. or lower) was used as the air.

(5) Defoaming Property

A total of 2.0 g of fluororesin was weighed into a Petri dish with an inner diameter of 26.4 mm (only a receiver in a set including a lid and the receiver in a flat Petri dish manufactured by Flat Co., Ltd., a glass thickness of 1 mm at the bottom), the Petri dish was placed in an inert oven (DN411I, manufactured by Yamato Scientific Co., Ltd.) and allowed to stand at room temperature for 30 min under an air stream (20 L/min), and the temperature was then raised to $280°$ C. over 30 min, followed by heating at $280°$ C. for 24 h. After that, the power of the inert oven was turned off while the oven door was closed and the air flow was maintained (20 L/min), the sample was naturally cooled for 12 h, and taken out. As a result, a fluororesin heat-melted molded product having a thickness of 3 mm and a diameter of 26.4 mm was obtained on the Petri dish. At this time, air compressed by a compressor was passed through a dehumidifier (dew point temperature$-20°$ C. or lower) was used as the air.

The appearance of the fluororesin heat-melted molded product (thickness 3 mm, diameter 26.4 mm) was observed, the number of bubbles was counted, and the ratio of the area occupied by the bubbles to the area of the molded product was calculated and evaluated according to the following criteria.

A: 0 bubbles
B: 1 to 10 bubbles and the area occupied by the bubbles is 10% or less of the area of the molded product
C: 11 or more bubbles and the area occupied by the bubbles is 10% or less of the area of the molded product
D: 1 to 10 bubbles and the area occupied by the bubbles is 11% or more of the area of the molded product
E: 11 or more bubbles and the area occupied by the bubbles is 11% to 69% of the area of the molded product
F: 11 or more bubbles and the area occupied by the bubbles is 70% or more of the total area of the molded product (6) Cracks after Heating at $280°$ C., Melting and Cooling A total of 2.0 g of fluororesin was weighed into a Petri dish with an inner diameter of 26.4 mm (only a receiver in a set including a lid and the receiver in a flat Petri dish manufactured by Flat Co., Ltd., a glass thickness of 1 mm at the bottom), the Petri dish was placed in an inert oven (DN411I, manufactured by Yamato Scientific Co., Ltd.) and allowed to stand at room temperature for 30 min under an air stream (20 L/min), and the temperature was then raised to $280°$ C. over 30 min, followed by heating at $280°$ C. for 24 h. After that, the power of the inert oven was turned off while the oven door was closed and the air flow was maintained (20 L/min), the sample was naturally cooled for 12 h, and taken out. As a result, a fluororesin heat-melted molded product having a thickness of 3 mm and a diameter of 26.4 mm was obtained on the Petri dish. At this time, air compressed by a compressor was passed through a dehumidifier (dew point temperature$-20°$ C. or lower) was used as the air.

The appearance of the fluororesin heat-melted molded product (thickness 3 mm, diameter 26.4 mm) was observed, the number of cracks was counted, and the evaluation was made according to the following criteria.

A: 3 cracks or less
B: 4 to 10 cracks
C: 11 to 49 cracks
D: 50 or more cracks (7) Yellow Index (YI) of Heat-Melted Molded Product (Thickness 3 mm) at $280°$ C. for 24 h.

A total of 2.0 g of fluororesin was weighed into a Petri dish with an inner diameter of 26.4 mm (only a receiver in a set including a lid and the receiver in a flat Petri dish manufactured by Flat Co., Ltd., a glass thickness of 1 mm at the bottom), the Petri dish was placed in an inert oven (DN411I, manufactured by Yamato Scientific Co., Ltd.) and allowed to stand at room temperature for 30 min under an air stream (20 L/min), and the temperature was then raised to $280°$ C. over 30 min, followed by heating at $280°$ C. for 24 h. After that, the power of the inert oven was turned off while the oven door was closed and the air flow was maintained (20 L/min), the sample was naturally cooled for 12 h, and taken out. As a result, a fluororesin heat-melted molded product having a thickness of 3 mm and a diameter of 26.4 mm was obtained on the Petri dish. At this time, air compressed by a compressor was passed through a dehumidifier (dew point temperature–20° C. or lower) was used as the air. The transmittance was measured at each wavelength at 1 nm intervals at wavelengths of 200 nm to 1500 nm using a spectrophotometer (U-4100, manufactured by Hitachi High-Tech Science Co., Ltd.) for each obtained fluororesin heat-melted molded product together with the Petri dish. Data at 5 nm intervals at wavelengths of 380 nm to 780 nm were extracted from the measured transmittance data, and the tristimulus values X, Y, and Z of the XYZ color system were calculated according to the method of JIS Z8701, the yellow index (YI) under a C light source (auxiliary illuminant C) was calculated according to the method of JIS K7373, and the yellow index (YI) of the fluororesin heat-melted molded product including the Petri dish was obtained. The yellow index (YI) of the Petri dish (receiver only) alone was measured, and the yellow index (YI) of the Petri dish (receiver only) was subtracted from the yellow index (YI) of the fluororesin molded product including the Petri dish to obtain the yellow index (YI) of the fluororesin heat-melted molded product having a size of 3 mm. The yellow index (YI) of the Petri dish alone (receiver only) was 0.21.

Example 2-1

A solution obtained by dissolving 0.0432 g (0.000103 mol) of bis(2,3,4,5,6-pentafluorobenzoyl) peroxide as an initiator in 0.130 g of hexafluorobenzene was placed in a glass ampule having a diameter of 30 mm and equipped with a magnetic stirrer, 5.0 g (0.0205 mol) of perfluoro(4-methyl-2-methylene-1,3-dioxolane) as a monomer, 19.87 g of ZEORORA-H (manufactured by Nippon Zeon Co., Ltd, 1,2,2,3,3,4,4-heptafluorocyclopentane) as a polymerization solvent, and 0.556 g (0.00465 mol) of chloroform (manufactured by Wako Pure Chemical Industries, Ltd.) as a chain transfer agent were added, nitrogen substitution and decompression were repeatedly performed and then the ampule was sealed under reduced pressure (amount of chain transfer agent: 10% by weight based on the total of the monomer and chain transfer agent). Precipitation polymerization was carried out by holding at 55° C. for 24 h while stirring with the magnetic stirrer in an upright state of the ampule, and a cloudy slurry was obtained in which the resin was precipitated in the polymerization solvent. After cooling to room temperature, the ampule was opened, the liquid including the produced resin particles was filtered off, and the particles were washed with acetone and vacuum dried to obtain perfluoro(4-methyl-2-methylene-1,3-dioxolane) resin particles (yield: 82%). The molecular weight distribution Mw/Mn was 2.5. Table 2-2 shows the evaluation results of the fluororesin.

Example 2-2

A solution obtained by dissolving 0.0432 g (0.000103 mol) of bis(2,3,4,5,6-pentafluorobenzoyl) peroxide as an initiator in 0.130 g of hexafluorobenzene was placed in a glass ampule having a diameter of 30 mm and equipped with a magnetic stirrer, 5.0 g (0.0205 mol) of perfluoro(4-methyl-2-methylene-1,3-dioxolane) as a monomer, 19.87 g of ZEORORA-H (manufactured by Nippon Zeon Co., Ltd, 1,2,2,3,3,4,4-heptafluorocyclopentane) as a polymerization solvent, and 1.250 g (0.0105 mol) of chloroform (manufactured by Wako Pure Chemical Industries, Ltd.) as a chain transfer agent were added, nitrogen substitution and decompression were repeatedly performed and then the ampule was sealed under reduced pressure (amount of chain transfer agent: 20% by weight based on the total of the monomer and chain transfer agent). Precipitation polymerization was carried out by holding at 55° C. for 24 h while stirring with the magnetic stirrer in an upright state of the ampule, and a cloudy slurry was obtained in which the resin was precipitated in the polymerization solvent. After cooling to room temperature, the ampule was opened, the liquid including the produced resin particles was filtered off, and the particles were washed with acetone and vacuum dried to obtain perfluoro(4-methyl-2-methylene-1,3-dioxolane) resin particles (yield: 80%). The molecular weight distribution Mw/Mn was 2.7. Table 2-2 shows the evaluation results of the fluororesin.

Example 2-3

A solution obtained by dissolving 0.0432 g (0.000103 mol) of bis(2,3,4,5,6-pentafluorobenzoyl) peroxide as an initiator in 0.130 g of hexafluorobenzene was placed in a glass ampule having a diameter of 30 mm and equipped with a magnetic stirrer, 5.0 g (0.0205 mol) of perfluoro(4-methyl-2-methylene-1,3-dioxolane) as a monomer, 19.87 g of ZEORORA-H (manufactured by Nippon Zeon Co., Ltd, 1,2,2,3,3,4,4-heptafluorocyclopentane) as a polymerization solvent, and 0.435 g (0.0364 mol) of chloroform (manufactured by Wako Pure Chemical Industries, Ltd.) as a chain transfer agent were added, nitrogen substitution and decompression were repeatedly performed and then the ampule was sealed under reduced pressure (amount of chain transfer agent: 8.0% by weight based on the total of the monomer and chain transfer agent). Precipitation polymerization was carried out by holding at 55° C. for 24 h while stirring with the magnetic stirrer in an upright state of the ampule, and a cloudy slurry was obtained in which the resin was precipitated in the polymerization solvent. After cooling to room temperature, the ampule was opened, the liquid including the produced resin particles was filtered off, and the particles were washed with acetone and vacuum dried to obtain perfluoro(4-methyl-2-methylene-1,3-dioxolane) resin particles (yield: 81%). The molecular weight distribution Mw/Mn was 2.4. Table 2-2 shows the evaluation results of the fluororesin.

Example 2-4

A solution obtained by dissolving 0.0432 g (0.000103 mol) of bis(2,3,4,5,6-pentafluorobenzoyl) peroxide as an initiator in 0.130 g of hexafluorobenzene was placed in a glass ampule having a diameter of 30 mm and equipped with a magnetic stirrer, 5.0 g (0.0205 mol) of perfluoro(4-methyl-2-methylene-1,3-dioxolane) as a monomer, 19.87 g of ZEORORA-H (manufactured by Nippon Zeon Co., Ltd, 1,2,2,3,3,4,4-heptafluorocyclopentane) as a polymerization solvent, and 0.236 g (0.0197 mol) of chloroform (manufactured by Wako Pure Chemical Industries, Ltd.) as a chain transfer agent were added, nitrogen substitution and decompression were repeatedly performed and then the ampule was sealed under reduced pressure (amount of chain transfer agent: 4.5% by weight based on the total of the monomer and chain transfer agent). Precipitation polymerization was carried out by holding at 55° C. for 24 h while stirring with the magnetic stirrer in an upright state of the ampule, and a cloudy slurry was obtained in which the resin was precipitated in the polymerization solvent. After cooling to room temperature, the ampule was opened, the liquid including the produced resin particles was filtered off, and the particles were washed with acetone and vacuum dried to obtain perfluoro(4-methyl-2-methylene-1,3-dioxolane) resin particles (yield:

83%). The molecular weight distribution Mw/Mn was 2.8. Table 2-2 shows the evaluation results of the fluororesin.

Example 2-5

A solution obtained by dissolving 0.0432 g (0.000103 mol) of bis(2,3,4,5,6-pentafluorobenzoyl) peroxide as an initiator in 0.130 g of hexafluorobenzene was placed in a glass ampule having a diameter of 30 mm and equipped with a magnetic stirrer, 5.0 g (0.0205 mol) of perfluoro(4-methyl-2-methylene-1,3-dioxolane) as a monomer, 19.87 g of ZEORORA-H (manufactured by Nippon Zeon Co., Ltd, 1,2,2,3,3,4,4-heptafluorocyclopentane) as a polymerization solvent, and 0.155 g (0.00130 mol) of chloroform (manufactured by Wako Pure Chemical Industries, Ltd.) as a chain transfer agent were added, nitrogen substitution and decompression were repeatedly performed and then the ampule was sealed under reduced pressure (amount of chain transfer agent: 3.0% by weight based on the total of the monomer and chain transfer agent). Precipitation polymerization was carried out by holding at 55° C. for 24 h while stirring with the magnetic stirrer in an upright state of the ampule, and a cloudy slurry was obtained in which the resin was precipitated in the polymerization solvent. After cooling to room temperature, the ampule was opened, the liquid including the produced resin particles was filtered off, and the particles were washed with acetone and vacuum dried to obtain perfluoro(4-methyl-2-methylene-1,3-dioxolane) resin particles (yield: 74%). The molecular weight distribution Mw/Mn was 2.5. Table 2-2 shows the evaluation results of the fluororesin.

Comparative Example 2-1

This comparative example was implemented in accordance with the polymerization conditions described in Samples 92 and 93 in Table 2 of NPL 1. However, the amount of the polymerization initiator charged was set between those of Samples 92 and 93. A total of 0.017 g (0.0000407 mol) of bis(2,3,4,5,6-pentafluorobenzoyl) peroxide as an initiator, 5.0 g (0.0205 mol) of perfluoro(4-methyl-2-methylene-1,3-dioxolane) as a monomer, and 8.2 g of hexafluorobenzene as a polymerization solvent were placed in a glass ampoule having a capacity of 75 mL and were sealed under reduced pressure after repeating nitrogen substitution and depressurization. When this ampoule was placed in a thermostat at 60° C. and held for 24 h to carry out radical solution polymerization, a viscous liquid in which the resin was dissolved was obtained. After cooling to room temperature, the ampoule was opened, and the resin solution was diluted with 36 g of hexafluorobenzene for viscosity adjustment to prepare a resin diluted solution. A total of 1 L of chloroform was added to a beaker equipped with an anchor blade, the resin was precipitated by adding the resin diluted solution to the chloroform under stirring, and the precipitate was vacuum-dried to obtain perfluoro(4-methyl-2-methylene-1,3-dioxolane) resin (yield: 66%). The molded product after heating at 280° C. for 24 h had a large number of bubbles, but the coloring was stronger than that of Example 2-5 by visual observation and weaker than that of Comparative Example 2-2. The molecular weight distribution Mw/Mn was 1.9. The evaluation results of the fluororesin are shown in Table 2-2.

Comparative Example 2-2

This comparative example was implemented in accordance with the polymerization conditions described in Sample 84 in Table 3 of NPL 1. However, NPL 1 does not describe the polymerization time, and in this example, it was set to 24 h. A total of 0.0578 g (0.000137 mol) of bis(2,3,4,5,6-pentafluorobenzoyl) peroxide as an initiator, 10.0 g (0.0410 mol) of perfluoro(4-methyl-2-methylene-1,3-dioxolane) as a monomer, 16.32 g of hexafluorobenzene as a polymerization solvent, and 0.0341 g (0.000286 mol) of carbon tetrabromide ($CBr_4$) as a chain transfer agent were placed in a glass ampoule having a capacity of 75 mL and were sealed under reduced pressure after repeating nitrogen substitution and depressurization (the amount of chain transfer agent: 0.34% by weight based on the total of the monomer and chain transfer agent). When this ampoule was placed in a thermostat at 60° C. and held for 24 h to carry out radical solution polymerization, a viscous liquid in which the resin was dissolved was obtained. After cooling to room temperature, the ampoule was opened, and the resin solution was diluted with 64 g of hexafluorobenzene for viscosity adjustment to prepare a resin diluted solution. A total of 1 L of chloroform was added to a beaker equipped with an anchor blade, the resin was precipitated by adding the resin diluted solution to the chloroform under stirring, and the precipitate was vacuum-dried to obtain perfluoro(4-methyl-2-methylene-1,3-dioxolane) resin (yield: 54%). The molecular weight distribution Mw/Mn was 3.7. The evaluation results of the fluororesin are shown in Table 2-2.

Comparative Example 2-3

This comparative example was implemented in accordance with the polymerization conditions described in Sample 78 in Table 3 of NPL 1. However, NPL 1 does not describe the polymerization time, and in this example, it was set to 24 h. A total of 0.0539 g (0.000128 mol) of bis(2,3,4,5,6-pentafluorobenzoyl) peroxide as an initiator, 10.0 g (0.0410 mol) of perfluoro(4-methyl-2-methylene-1,3-dioxolane) as a monomer, 16.32 g of hexafluorobenzene as a polymerization solvent, and 0.1143 g (0.000957 mol) of carbon tetrabromide ($CBr_4$) as a chain transfer agent were placed in a glass ampoule having a capacity of 75 mL and were sealed under reduced pressure after repeating nitrogen substitution and depressurization (the amount of chain transfer agent: 1.13% by weight based on the total of the monomer and chain transfer agent). When this ampoule was placed in a thermostat at 60° C. and held for 24 h to carry out radical solution polymerization, a viscous liquid in which the resin was dissolved was obtained. After cooling to room temperature, the ampoule was opened, and the resin solution was diluted with 36 g of hexafluorobenzene for viscosity adjustment to prepare a resin diluted solution. A total of 1 L of chloroform was added to a beaker equipped with an anchor blade, the resin was precipitated by adding the resin diluted solution to the chloroform under stirring, and the precipitate was vacuum-dried to obtain perfluoro(4-methyl-2-methylene-1,3-dioxolane) resin (yield: 40%). The molecular weight distribution Mw/Mn was 2.5. The evaluation results of the fluororesin are shown in Table 2-2.

TABLE 2-2

|  | Example 2-1 | Example 2-2 | Example 2-3 | Example 2-4 | Example 2-5 |
|---|---|---|---|---|---|
| Weight average molecular weight $Mw \times 10^4$ | 8.7 | 5.9 | 12 | 19 | 27 |
| Glass transition temperature (° C.) | 131.1 | 130.1 | 131.3 | 130.5 | 130.8 |
| Melt viscosity (Pa · s) | $5.3 \times 10^3$ | $1.2 \times 10^3$ | $1.1 \times 10^4$ | $3.7 \times 10^4$ | $1.2 \times 10^5$ |
| Defoaming property | A | A | A | B | C |
| Cracks after heating for 24 h at 280° C. and cooling | A | B | A | A | A |
| Difference in weight loss amount between after heating for 30 min at 300° C. and immediately after heating to 300° C. | 0.05 | 0.09 | 0.07 | 0.08 | 0.09 |
| Yellow index (YI) after heating for 24 h at 280° C. | 1.7 | 2.0 | 1.9 | 2.5 | 5.6 |

|  | Comparative Example 2-1 | Comparative Example 2-2 | Comparative Example 2-3 |
|---|---|---|---|
| Weight average molecular weight $Mw \times 10^4$ | 73 | 6.3 | 1.0 |
| Glass transition temperature (° C.) | 130.9 | 128.3 | 117.6 |
| Melt viscosity (Pa · s) | $1 \times 10^7$ | — | — |
| Defoaming property | F | A | A |
| Cracks after heating for 24 h at 280° C. and cooling | A | C | D |
| Difference in weight loss amount between after heating for 30 min at 300° C. and immediately after heating to 300° C. | 0.10 | 1.1 | 3.6 |
| Yellow index (YI) after heating for 24 h at 280° C. | Large number of bubbles | 11.2 | 12.8 |

The method for producing a fluororesin according to the second aspect of the present invention has a higher yield than the method described in NPL 1, makes it possible to produce a fluororesin at a yield of 70% or more as shown in Examples 2-1 to 2-5, and depending on the conditions, and makes it possible to produce a fluororesin at a yield of 75% or more.

INDUSTRIAL APPLICABILITY

The first aspect of the present invention provides fluororesin particles having excellent flowability and filling property and a small amount of weight loss in heating and a method for producing the fluororesin particles. The second aspect of the present invention is useful in a field related to fluororesins.

The invention claimed is:

1. Resin particles, comprising:
   a resin comprising a residue unit of the following formula (1),
   wherein the resin particles have a volume average particle diameter of from 5 µm to 500 µm, and wherein the 90% particle diameter of the resin particles is 1000 µm or less,

(1)

wherein $Rf_1$, $Rf_2$, $Rf_3$, and $Rf_4$ are each independently one selected from the group consisting of a fluorine atom, a linear perfluoroalkyl group having 1 to 7 carbon atoms, a branched perfluoroalkyl group having 3 to 7 carbon atoms, and a cyclic perfluoroalkyl group having 3 to 7 carbon atoms, the linear or branched perfluoroalkyl group optionally have an ethereal oxygen atom, $Rf_1$, $Rf_2$, $Rf_3$, and $Rf_4$ may be linked to one another to form a ring having 4 to 8 carbon atoms, and the ring optionally includes an ethereal oxygen atom.

2. The resin particles according to claim 1, wherein an angle of repose of the resin particles is from 5° to 60°.

3. The resin particles according to claim 1, wherein the resin comprises a precipitation polymerization polymer.

4. The resin particles according to claim 1, wherein a bulk density of the resin particles is from 0.2 g/mL to 1.5 g/mL.

5. The resin particles according to claim 1, wherein an amount of weight loss in heating at 250° C. of the resin particles is 1% or less by weight.

6. The resin particles according to claim 1, wherein the resin particles do not contain an emulsifier, a dispersant, or a combination thereof.

7. The resin particles according to claim 1, wherein the residue unit is a perfluoro(4-methyl-2-methylene-1,3-dioxolane) residue unit of the following formula (2),

[C3]

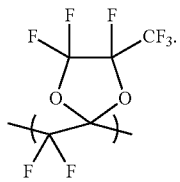

(2)

8. The resin particles according to claim 1, wherein an angle of repose of the resin particles is from 5° to 40°.

9. The resin particles according to claim 1, wherein the 10% particle diameter of the resin particles is at least 3 μm.

10. The resin particles according to claim 1, wherein the resin particles have a volume average particle diameter of from 5 μm to 176 μm, and wherein the 90% particle diameter of the resin particles is 308 μm or less.

* * * * *